(12) United States Patent
Yamashita et al.

(10) Patent No.: US 11,322,808 B2
(45) Date of Patent: May 3, 2022

(54) SECONDARY BATTERY MODULE AND METHOD OF PRODUCING THE SAME

(71) Applicant: TOYOTA JIDOSHA KABUSHIKI KAISHA, Toyota (JP)

(72) Inventors: Yuji Yamashita, Susono (JP); Hirokazu Kawaoka, Nisshin (JP); Sumiko Kito, Nagoya (JP); Nagato Nakajima, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/842,955

(22) Filed: Apr. 8, 2020

(65) Prior Publication Data

US 2020/0335764 A1 Oct. 22, 2020

(30) Foreign Application Priority Data

Apr. 22, 2019 (JP) .............................. JP2019-080667

(51) Int. Cl.
*H01M 50/54* (2021.01)
*H01M 10/48* (2006.01)
*H01M 10/42* (2006.01)
*H01M 50/20* (2021.01)
*H01M 50/502* (2021.01)
*H01M 50/578* (2021.01)

(52) U.S. Cl.
CPC ......... *H01M 50/54* (2021.01); *H01M 10/425* (2013.01); *H01M 10/482* (2013.01); *H01M 50/20* (2021.01); *H01M 50/502* (2021.01); *H01M 50/578* (2021.01)

(58) Field of Classification Search
CPC .. H01M 50/54; H01M 50/502; H01M 50/578; H01M 50/70; H01M 10/425; H01M 10/482

See application file for complete search history.

(56) References Cited

U.S. PATENT DOCUMENTS

2006/0267545 A1* 11/2006 Lee ..................... H01M 50/209
  320/106
2010/0190055 A1* 7/2010 Khakhalev .......... H01M 50/516
  429/211
2011/0309837 A1 12/2011 Nishihara et al.
(Continued)

FOREIGN PATENT DOCUMENTS

JP 2012003959 A 1/2012
JP 5312000 B2 10/2013
(Continued)

*Primary Examiner* — Jimmy Vo
(74) *Attorney, Agent, or Firm* — Dickinson Wright, PLLC

(57) ABSTRACT

A secondary battery module showing excellent packing efficiency which makes it possible to connect a secondary battery and a charge/discharge device with a stably low resistance without any unnecessary deformation of the secondary battery or an electrode terminal is disclosed. The secondary battery module includes a plurality of stack units, each of the stack units including: at least one non-conductive plate member; at least one conductive member fixed to the plate member; a secondary battery stacked on the plate member; and at least one electrode terminal sticking out of a side face of the secondary battery, and held by the conductive member.

12 Claims, 29 Drawing Sheets

(56) References Cited

U.S. PATENT DOCUMENTS

2013/0164585 A1\* 6/2013 Kwak ................... H01M 50/50
                                                          429/96
2017/0025661 A1\* 1/2017 Gibeau .................. B60L 50/15
2018/0175357 A1\* 6/2018 Lin ..................... H01M 50/502

FOREIGN PATENT DOCUMENTS

| JP | 2013219986 A | 10/2013 |
|----|--------------|---------|
| JP | 2014102883 A | 6/2014 |
| JP | 2019197712 A | 11/2019 |

\* cited by examiner

SECONDARY BATTERY MODULE AND METHOD OF PRODUCING THE SAME

FIELD

The present application discloses, for example, a secondary battery module including a plurality of secondary batteries.

BACKGROUND

JP 2014-102883 A and JP 2012-003959 A disclose a secondary battery module including a plurality of secondary batteries in parallel, electrode terminals of the secondary batteries being respectively held by a plurality of chuck units that are connected to an external charge/discharge device.

SUMMARY

Technical Problem

Holding electrode terminals of secondary batteries by chuck units as disclosed in JP 2014-102883 A and JP 2012-003959 A necessitates a complex mechanism for opening and closing the chuck units. A large space for opening and closing the chuck units, that is, a large clearance between electrode terminals in a secondary battery module is also necessary, which easily leads to a large secondary battery module as a whole. Further, the thickness of a secondary battery is not uniform as a whole but has a tolerance, and a secondary battery expands/contracts when charged/discharged, which lead to a positional shift of chuck units from electrode terminals, which may lead to an excessive force applying to the electrode terminals when the terminals are held by the chuck units, to unnecessarily damage the electrode terminals.

Solution to Problem

As one means for solving the problems, the present application discloses a secondary battery module that includes a plurality of stack units, each of the stack units comprising: at least one non-conductive plate member; at least one conductive member fixed to the plate member; a secondary battery stacked on the plate member; and at least one electrode terminal sticking out of a side face of the secondary battery, and held by the conductive member.

In the secondary battery module of the present disclosure, the conductive member holding the electrode terminal may be made up of a plurality of components in combination.

In the secondary battery module of the present disclosure, the conductive member holding the electrode terminal may include a component A abutting one face of the electrode terminal, and a component B abutting another face of the electrode terminal.

In the secondary battery module of the present disclosure, the component A may be fixed to one of the plate members, the one being arranged on the component A on one side, and the component B may be fixed to another one of the plate members, the other one being arranged on the component B on another side.

In the secondary battery module of the present disclosure, the conductive member may be fixed only to one of the plate members, the one being arranged on the conductive member on one side.

In the secondary battery module of the present disclosure, the secondary battery module may be structured so that: pressure is applied to the conductive member; and stopping applying the pressure releases the conductive member from holding the electrode terminal.

In the secondary battery module of the present disclosure, the conductive member may have notches at a portion where the electrode terminal is held.

In the secondary battery module of the present disclosure, the conductive member may hold the electrode terminal between one and another one of the plate members, the one being arranged on the conductive member on one side, the other one being arranged on the conductive member on another side.

In the secondary battery module of the present disclosure, the conductive member may have a hooking part arranged along a side face of the plate member.

As one means for solving the problems, the present application discloses a method of producing a secondary battery module, the method comprising: preparing a non-conductive plate member, a conductive member, and a secondary battery, out of the secondary battery an electrode terminal sticking; fixing the conductive member to the plate member; stacking the secondary battery on the plate member; and holding, by the conductive member, the electrode terminal of the secondary battery.

In the method of the present disclosure, a conductive member having a gap that wider than a thickness of the electrode terminal may be prepared as the conductive member, and after the electrode terminal is arranged in the gap of the conductive member, a width of the gap may be narrowed, to hold the electrode terminal by the conductive member.

In the method of the present disclosure, after the electrode terminal is held by the conductive member, the electrode terminal may be slid.

In the method of the present disclosure, a conductive member having a gap may be prepared as the conductive member, a width of the gap being narrower than a thickness of the electrode terminal, and the electrode terminal may be inserted into the gap of the conductive member, to hold the electrode terminal by the conductive member.

Advantageous Effects

In the secondary battery module of the present disclosure, a conductive member is fixed to, and a secondary battery is stacked on a plate member, and an electrode terminal of the secondary battery is held by the conductive member. In this case, the plate member may position the secondary battery and the conductive member, which makes it easy to avoid a positional shift between the electrode terminal and the conductive member to easily suppress unnecessary damage to the electrode terminal. In the secondary battery module of the present disclosure, no complex mechanism for opening and closing chuck units or the like, like conventional arts is necessary, and the packing efficiency of the whole of the module can be improved.

DESCRIPTION OF EMBODIMENTS

First Embodiment

Figure 1:
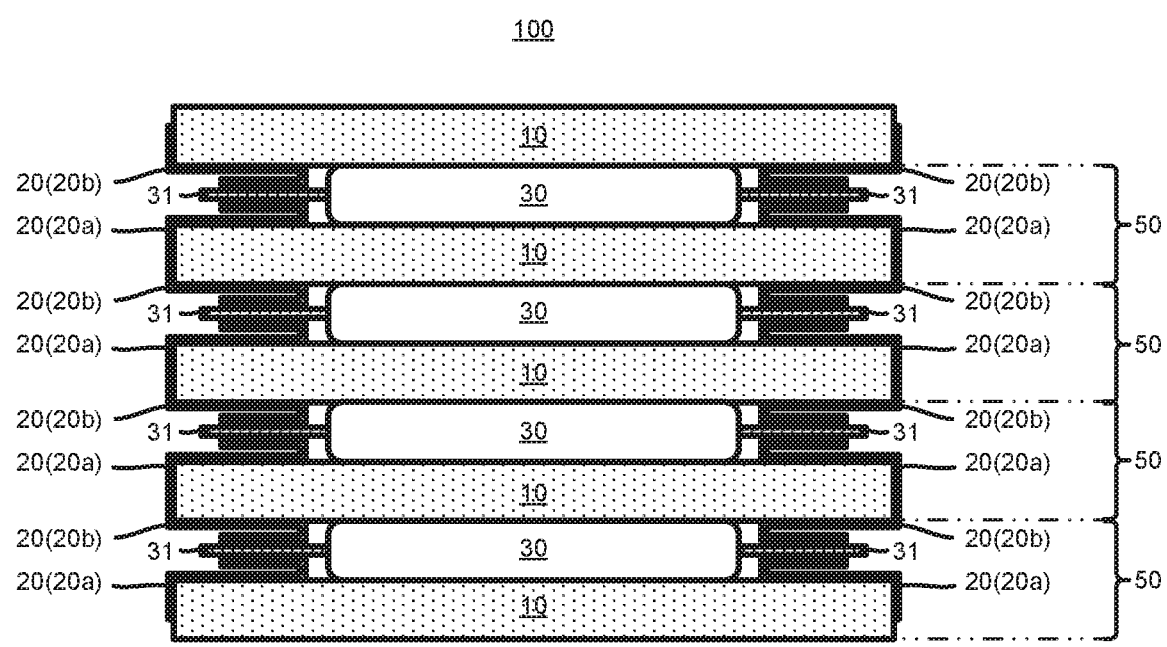
FIG. 1 is an explanatory schematic view of a structure of a secondary battery module 100.

FIG. 1 schematically shows the structure of a secondary battery module 100. As shown in FIG. 1, the secondary battery module 100 includes a plurality of stack units 50. Each of the stack units 50 comprises: at least one non-conductive plate member 10; at least one conductive member 20 fixed to the plate member 10; a secondary battery 30 stacked on the plate member 10; and at least one electrode terminal 31 sticking out of a side face of the secondary battery 30, and held by the conductive member 20.

1.1. Plate Member 10

Figure 2:
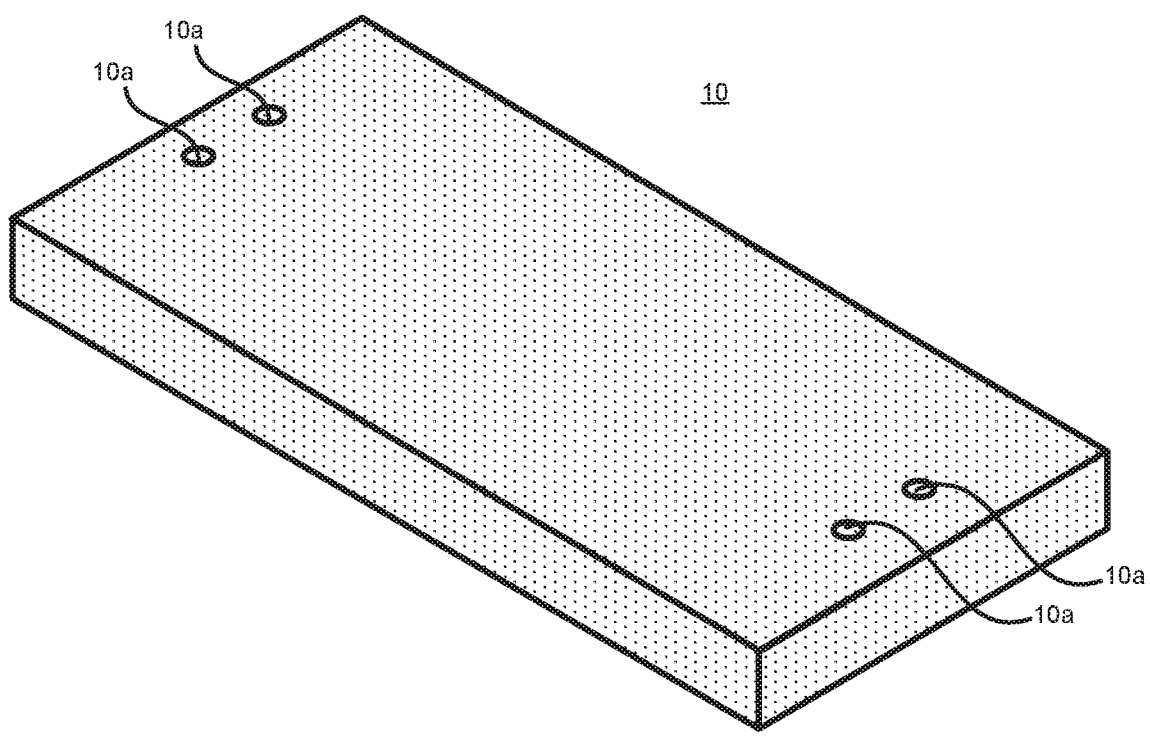
FIG. 2 is an explanatory schematic view of a structure of a plate member 10.

FIGS. 1 and 2 schematically show the structure of the plate member(s) 10. As shown in FIGS. 1 and 2, each plate member 10 is a tabular member having a certain thickness. The area of each of one and the other faces of the plate member, both of which are planes approximately orthogonal to the stacking direction, and the thickness of the plate member are not particularly limited, and may be suitably determined according to, for example, the size of the module to be aimed. The area of each of one and the other faces of the plate member 10 may be larger than that of the secondary battery 30 from the viewpoint that the secondary battery 30 may be easily arranged and constrained. The thickness of the plate member 10 may be 1 mm to 20 mm in view of securing a sufficient rigidity etc.

As shown in FIG. 2, holes 10a for fixing the conductive member 20 or the like may be provided for the plate member 10. The positions of the holes 10a in the plate member 10 are not particularly limited, and may be at any of one face, the other face, and side faces of the plate member 10. The conductive member 20 may be easily fixed to the plate member 10 as a fixing member for fixing the conductive member 20, such as a bolt and a screw is inserted into the holes 10a.

The plate member 10 is made of a non-conductive material. Specific examples of the non-conductive material include various resins and ceramics. The plate member 10 made of such a non-conductive material may function as a positioning member for the conductive member 20 and the secondary battery 30, and may function as a member to prevent heat conduction, fire spreading, etc. due to heat generation of the battery in an unusual situation.

The aspect shown in FIG. 2 is just one aspect of a plate member which may be employed for the secondary battery module of the present disclosure. In the secondary battery module of the present disclosure, the shape of the plate member is not limited to that as shown in FIG. 2. For example, the plate member may have bumps and dents for positioning the conductive member 20 and the secondary battery 30. The shape of one and the other faces of the plate member is not limited to a rectangle shown in FIG. 2, but may be suitably changed according to the shape of the secondary battery 30 etc.

1.2. Conductive Member 20

Figure 3:
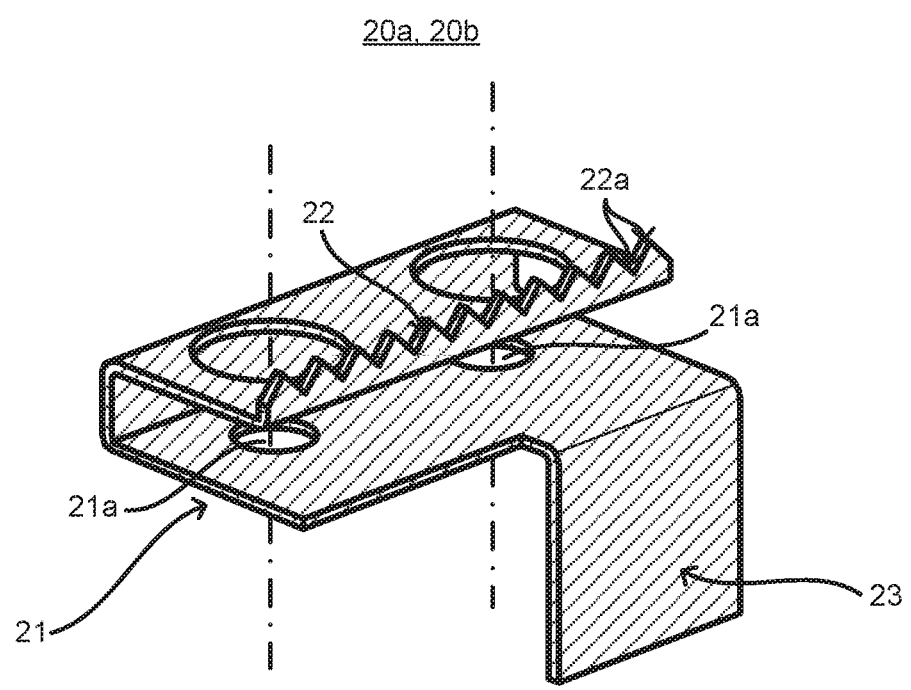
FIG. 3 is an explanatory schematic view of a component of a conductive member 20.
Figure 4:
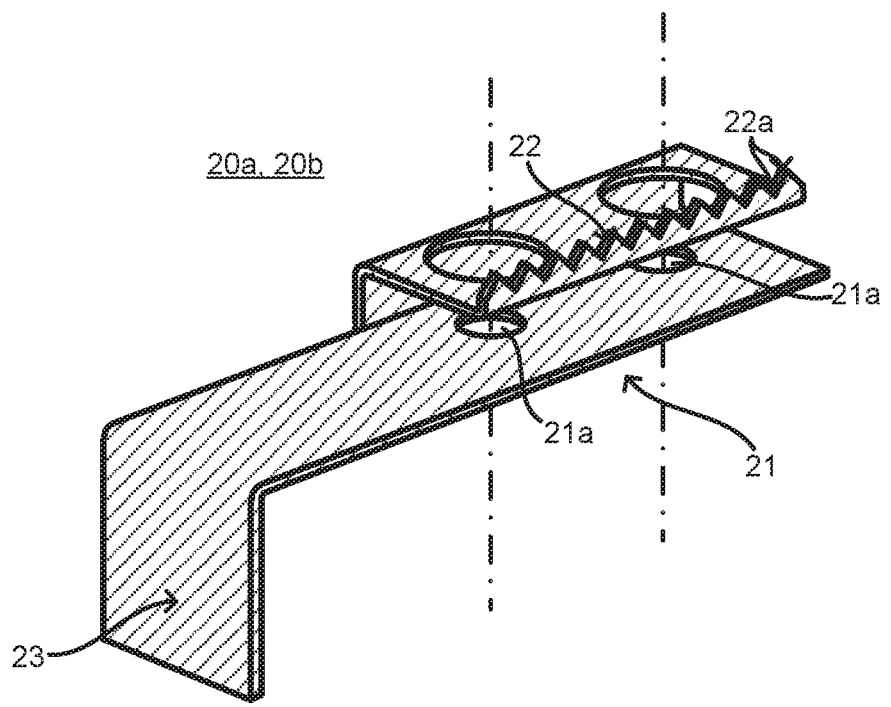
FIG. 4 is an explanatory schematic view of a variation of the conductive member 20.

The conductive member 20 may take any shape as long as fixable to the plate member 10 and able to hold the electrode terminal 31, that is, abutting both faces of the electrode terminal 31. FIGS. 1 and 3 schematically show one example of the components of the conductive member 20. FIG. 4 schematically shows a variation of a component of the conductive member 20. As shown in FIGS. 1, 3 and 4, in the secondary battery module 100, one conductive member 20 holding the electrode terminal 31 may be made up of a plurality of components 20a and 20b in combination. More specifically, as shown in FIGS. 1, 3 and 4, one conductive member 20 holding the electrode terminal 31 may include the component 20a that abuts one face of the electrode terminal 31, and the component 20b that abuts the other face of the electrode terminal 31. In this case, as shown in FIGS. 1, 3 and 4, the component 20a may be fixed to one plate member 10 that is arranged on one side of the component 20a, the one side being opposite to the side where the component 20a abuts the electrode terminal 31, and the component 20b may be fixed to another plate member 10 that is arranged on the other side of the component 20b, the other side being opposite to the side where the component 20b abuts the electrode terminal 31. That is, one conductive member 20 in one stack unit 50 may be constituted of a plurality of the components 20a and 20b, which are not linked to each other. Constituting the conductive member 20 of a plurality of the components 20a and 20b as described above makes it possible to further easily hold the electrode terminal 31. Constituting the conductive member 20 of a plurality of the components 20a and 20b makes it easier to connect a terminal for voltage measurement to one of a plurality of the components 20a and 20b, and to connect a terminal for current measurement to the other thereof when the secondary battery 30 is charged/discharged by a charge/discharge device, as described later. This makes it possible to measure the voltage of each secondary battery with a high degree of accuracy, and to do a high-accuracy charge/discharge test.

As shown in FIGS. 3 and 4, the conductive member 20 may have a fixing part 21 to be fixed to the plate member 10. In this case, as shown in FIGS. 3 and 4, through holes 21a into which a fixing member such as a bolt and a screw is inserted may be provided for the fixing part 21 of each of the components 20a and 20b. The number of the through holes 21a is not particularly limited. A plurality of the through holes 21a may be provided in view of making firmer fixation possible.

As shown in FIGS. 3 and 4, the conductive member 20 may have an abutting part 22 to abut the electrode terminal 31 of the secondary battery 30. In this case, notches 22a may be provided for at least part of the abutting part 22 of the conductive member 20. In other words, the conductive member 20 may have the notches 22a at a portion where the electrode terminal 31 is held. This makes it possible for the conductive member 20 to be partially lodged in the electrode terminal 31 when the conductive member 20 holds the electrode terminal 31. For example, even when the electrode terminal 31 has an oxide film over the surface thereof, the notches 22a of the conductive member 20 may break the oxide film over the surface of the electrode terminal 31 to lower the contact resistance of the conductive member 20 and the electrode terminal 31. Lowering the contact resistance of the conductive member 20 and the electrode terminal 31 may suppress heat generation at the holding part even when a large current flows. In addition, the performance of the secondary battery 30 is difficult to deteriorate when the secondary battery 30 is charged/discharged via the conductive member 20.

As shown in FIGS. 1, 3 and 4, the components 20a and 20b constituting the conductive member 20 may have a shapeable to hook and hold the plate member 10. For example, as shown in FIGS. 3 and 4, the conductive member 20 may have a hooking part 23 to be arranged along a side face of the plate member 10. This makes it easier to position and fix the conductive member 20 at and to the plate member 10. When the secondary battery 30 is charged/discharged, a terminal of a charge/discharge device may be easily put onto the hooking part 23, which makes it easier to charge/discharge each secondary battery 30 without a conventional complex mechanism for opening and closing chuck units or the like, as described later. The aspect of the hooking part 23 in the conductive member 20 is not limited to those shown in FIGS. 3 and 4, and may be suitably changed according to the shape of the place where the conductive member 20 is fixed in the plate member 10.

The conductive member 20 is made of a conductive material. Specific examples of the conductive material include various metals. Holding the electrode terminal 31 of the secondary battery 30 by such a conductive member 20 made of a conductive material makes it possible to, for example, charge/discharge the secondary battery 30 via the conductive member 20. That is, the secondary battery 30 may be charged/discharged etc. as a terminal of a charge/discharge device is put onto the conductive member 20.

The number of the conductive members 20 fixed to the plate member 10 is not particularly limited, and may be suitably determined according to the number and the shape of the electrode terminals 31 of the secondary battery 30. The place where the conductive member 20 is fixed in the plate member 10 may be suitably determined as well according to the position of the electrode terminal 31 of the secondary battery 30 etc.

The aspect shown in FIGS. 3 and 4 is just one aspect of a conductive member which may be employed in the secondary battery module of the present disclosure. The same function as the conductive member 20 may be secured by a different shape from the conductive member 20. In the secondary battery module of the present disclosure, the shape of the conductive member may be any as long as the conducting member can hold the electrode terminal, such as a flat tabular shape without any curve, an approximately L-shape, an approximately U-shape, or any other shape, in addition to the shapes as shown in FIGS. 3 and 4. The way of fixing the conductive member to the plate member is not limited to fixing with a bolt or a screw as described above. Any fixing way such as fixing with a nut, fixing with an adhesive, and fixing by fitting may be employed. Fixing with a bolt or a screw is preferable in view of easier fixing.

1.3. Secondary Battery 30

Figure 5:
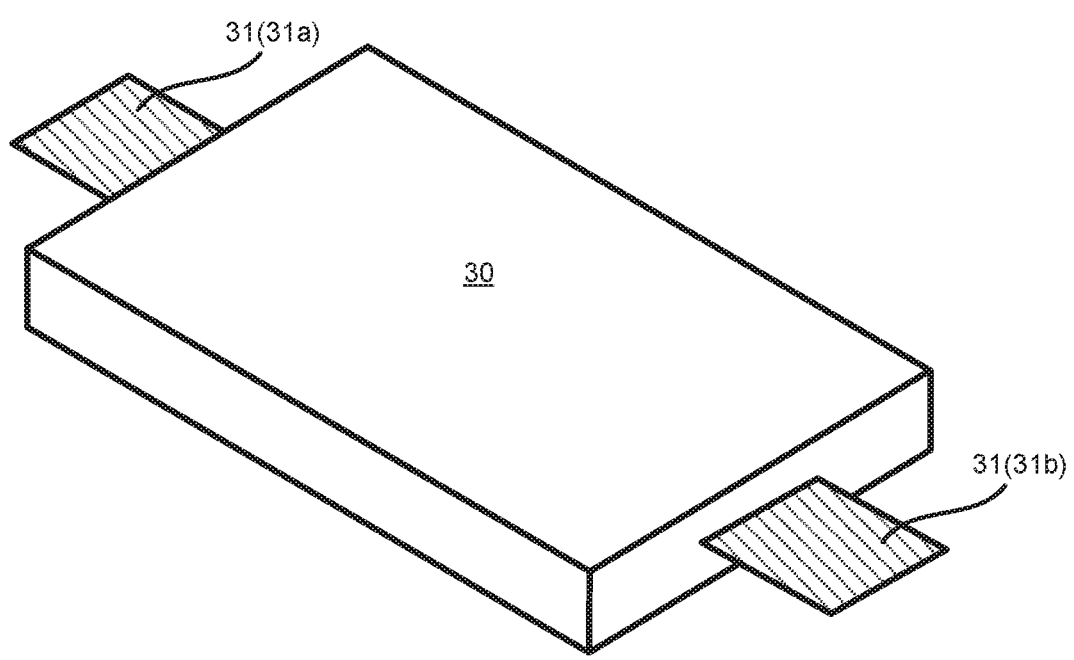
FIG. 5 is an explanatory schematic view of a structure of a secondary battery 30.

FIG. 5 schematically shows the structure of a secondary battery 30. The secondary battery 30 has only to have at least one electrode terminal 31 sticking out from a side face thereof, and be chargeable/dischargeable via the electrode terminal 31. For example, as shown in FIG. 5, the secondary battery 30 may have a cathode terminal 31a and an anode terminal 31b. The cathode terminal 31a and the anode terminal 31b may, as shown in FIG. 5, stick out from different side faces of the secondary battery 30 in different directions respectively, or may stick out from the same side face of the secondary battery 30 in the same direction. "Side face" of the secondary battery 30 means a face substantially in the stacking direction of the stack unit 50. That is, the secondary battery 30 has stacking faces crossing the stacking direction, or faces with which the plate member is to be stacked, and side faces substantially in the stacking direction. "Electrode terminal 31 sticking out from a side face of the secondary battery 30" means the electrode terminal 31 sticking out in the direction crossing the stacking direction. The same will be hereinafter applied.

The secondary battery 30 may be an electrolyte solution-based secondary battery, and may be a solid battery. Providing a constraining member 60 for the secondary battery module 100 makes it possible for a constraint pressure from the constraining member 60 to easily lower the internal resistance of the secondary battery 30 etc., as described later. That is, when a solid battery is employed for the secondary battery 30, adjusting a constraint pressure easily improves the battery performance.

The structure inside the secondary battery 30 including a cathode, an electrolyte, and an anode may be the same as a known structure, and for example, may be the same as that of a known lithium ion secondary battery. The structure outside the secondary battery 30 may be also the same as a known structure. For example, the secondary battery 30 may be packed in exterior packing. Laminate film or the like may be employed for exterior packing.

The material and shape of the electrode terminal 31 of the secondary battery 30 is not particularly limited, and may be the same as that of a known terminal. For example, the electrode terminal 31 may be a metal plate or metal foil made from copper, aluminum, or the like.

The electrode terminal 31 of the secondary battery 30 has only to be held by the conductive member 20. In the secondary battery module 100, the place where the electrode terminal 31 is held by the conductive member 20 is not particularly limited. For example, the conductive member 20 may hold the electrode terminal 31 between one plate member 10 that is arranged on one side of the conductive member 20, and another plate member 10 that is arranged on the other side of the conductive member 20 in view of further improving the packing efficiency.

1.4. Stack Unit 50

As shown in FIG. 1, the stack unit 50 is formed of at least one plate member 10; at least one conductive member 20 fixed to the plate member 10; and the secondary battery 30 stacked on the plate member 10, and is formed by the conductive member 20 holding the electrode terminal 31 of the secondary battery 30. The method of producing the stack unit 50 will be described in detail later.

1.5. Other Structure

The secondary battery module 100 is formed by stacking a plurality of the stack units 50. For example, as shown in FIG. 1, one stack unit 50 on one side or the plate member 10 side may be stacked on another stack unit 50 on the other side or the secondary battery 30 side so that the secondary battery 30 is held between two plate members 10, 10. The method of producing the secondary battery module 100 will be described in detail later.

FIG. 1 shows the embodiment of arranging the secondary battery 30 only on the other side of each of a plurality of the stack units 50, to stack the stack units 50 in the same direction. The secondary battery module of the present disclosure is not limited to this embodiment.

FIG. 1 shows the embodiment of stacking the secondary battery 30 on each of a plurality of the stack units 50 only on the other side. The secondary battery module of the present disclosure is not limited to this embodiment. The secondary batteries 30 may be stacked on both faces of the plate member 10 to form the stack unit. In this case, the electrode terminal 31 may be held by the conductive member 20 in the secondary battery 30 stacked on the stack unit 50 on the one side, as well as in the secondary battery 30 stacked thereon on the other side.

FIG. 1 further shows the embodiment of stacking a plurality of the stack units 50, 50, . . . so that they directly contact each other. The secondary battery module of the present disclosure is not limited to this embodiment. Some middle member may be held between a plurality of the stack units 50, 50, . . . . For example, a stack unit of a different aspect from the stack unit 50 may be held as long as the foregoing problems may be solved.

Figure 6:
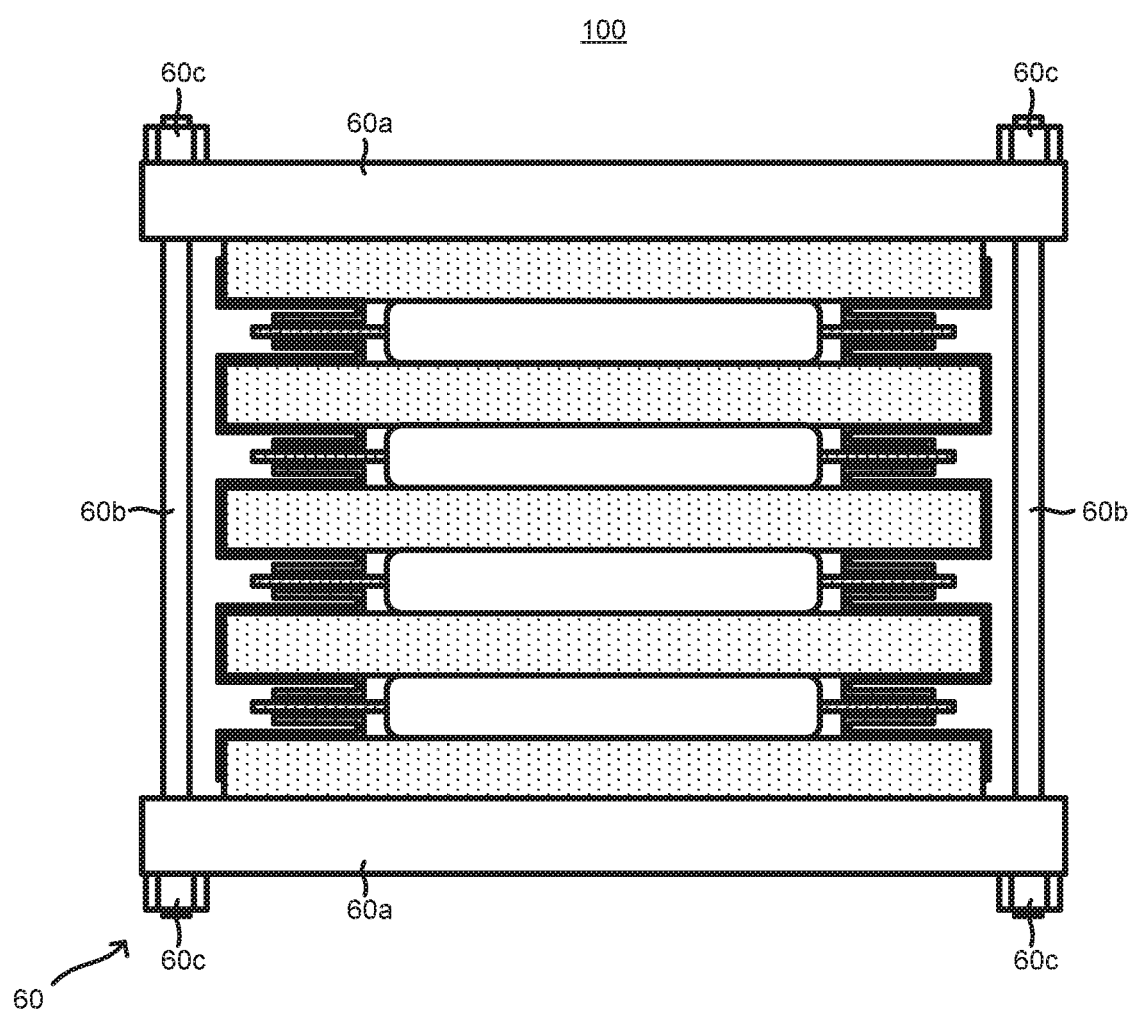
FIG. 6 is an explanatory schematic view of a structure of a constraining member 60.

As shown in FIG. 6, the secondary battery module 100 may include the constraining member 60. Specifically, in the secondary battery module 100, a constraint pressure by the constraining member 60 may be applied to a plurality of the stack units 50, 50, . . . from both sides in the stacking direction. This makes the secondary battery module 100 easy to handle, and makes it expectable to lower the internal resistance etc. of the battery due to the constraint pressure.

The mode of the constraining member 60 is not particularly limited. Examples thereof include the constraining member 60 including, as shown in FIG. 6, tabular parts 60a. 60a to hold both end sides of the stack units 50, 50, . . . in the stacking direction in the secondary battery module 100, bars 60b coupling the tabular parts 60a, 60a, and adjusters 60c coupled with the bars 60b to adjust a gap between the tabular parts 60a, 60a with a screw structure etc. In this case, the bars 60b may be arranged outside the plate member 10 as shown in FIG. 6, or may penetrate through the plate member 10. Examples of other modes of the constraining member include a constraining member utilizing an elastic pressure by an elastic member.

1.6. Method of Producing Secondary Battery Module 100

Figure 7:
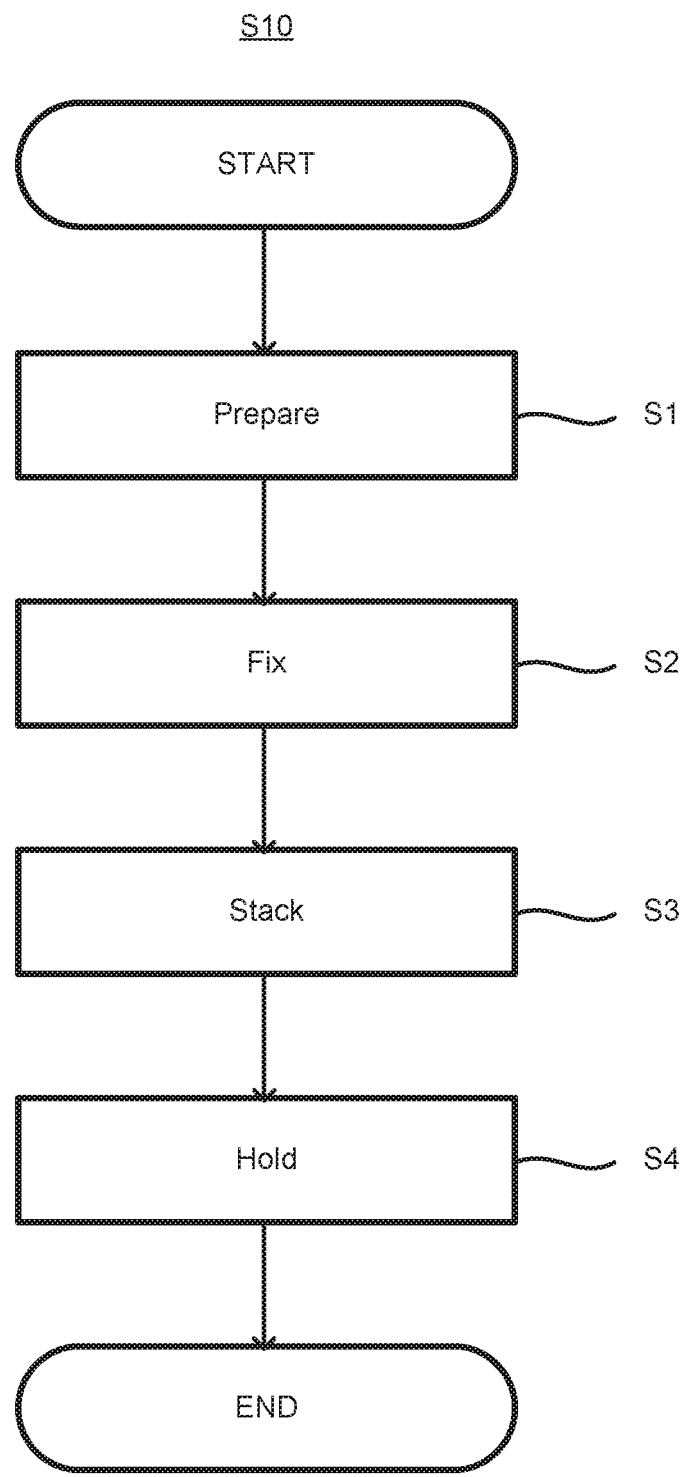
FIG. 7 is an explanatory flowchart of a method of producing the secondary battery module 100, or a production method S10.

One example of the method of producing the secondary battery module 100 will be described with reference to FIGS. 7 to 11. As shown in FIG. 7, the method of producing the secondary battery module 100 S10 includes a step S of preparing the non-conductive plate member 10, the conductive member 20, and the secondary battery 30, out of the secondary battery 30 the electrode terminal 31 sticking, a step S2 of fixing the conductive member 20 to the plate member 10, a step S3 of stacking the secondary battery 30 on the plate member 10, and a step S4 of holding, by the conductive member 20, the electrode terminal 31 of the secondary battery 30.

1.6.1. Step S1

In the step S1, the non-conductive plate member 10, the conductive member 20, and the secondary battery 30 out of which the electrode terminal 31 sticks are prepared. The structures of the plate member 10, conductive member 20, and secondary battery 30 are as described above, and descriptions thereof are omitted here.

1.6.2. Step S2

Figure 8A:
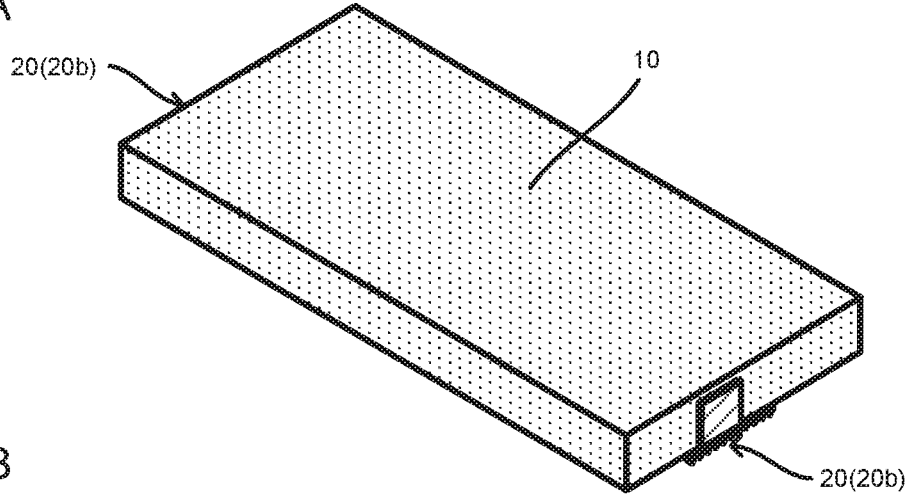
FIGS. 8A to 8C are explanatory schematic views of a step S2 in the production method S10.
Figure 8B:
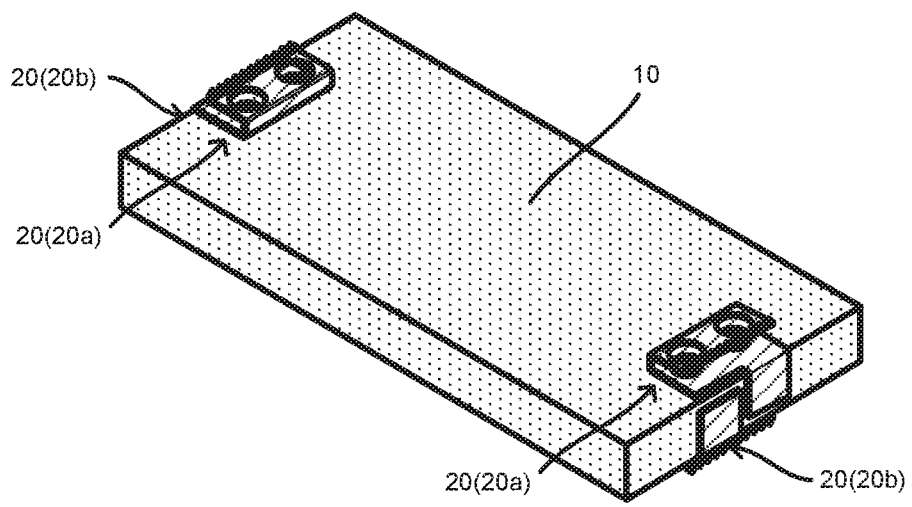
Figure 8C:
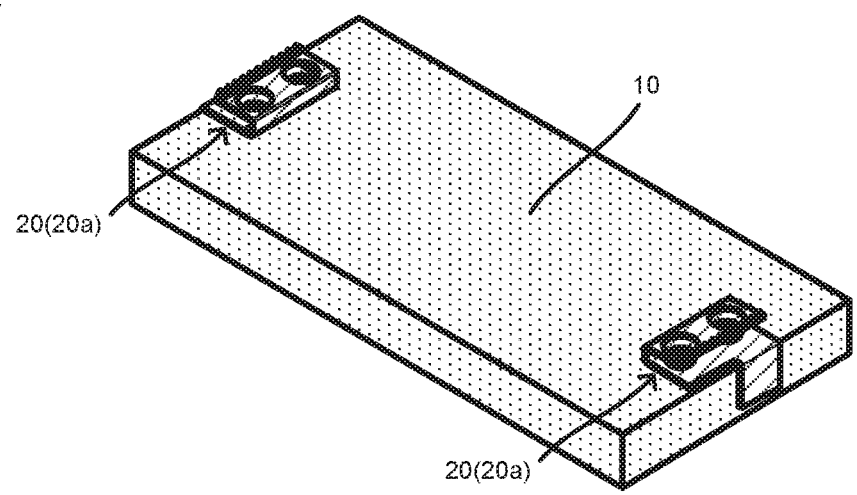

In the step S2, the conductive member 20 is fixed to the plate member 10. For example, as shown in FIGS. 8A to 8C, after the conductive member 20 is arranged on the plate member 10 so that the holes 10a of the plate member 10 are superimposed on the through holes 21a of the conductive member 20, a fixing member such as a bolt and a screw is inserted into the holes 10a and the through holes 21a, which makes it possible to fix the conductive member 20 at a desired position on the plate member 10. Or, as described above, the conductive member 20 may be fixed to the plate member 10 by a means other than a fixing member.

In the step S2, the conductive member 20 or the component 20b may be fixed to only one face of the plate member 10 (FIG. 8A), the conductive member 20 or the components 20a and 20b may be fixed to both of one and the other faces of the plate member 10 (FIG. 8B), and the conductive member 20 or the component 20a may be fixed to only the other face of the plate member 10 (FIG. 8C), according to the embodiment of the secondary battery module 100.

1.6.3. Step S3

Figure 9:
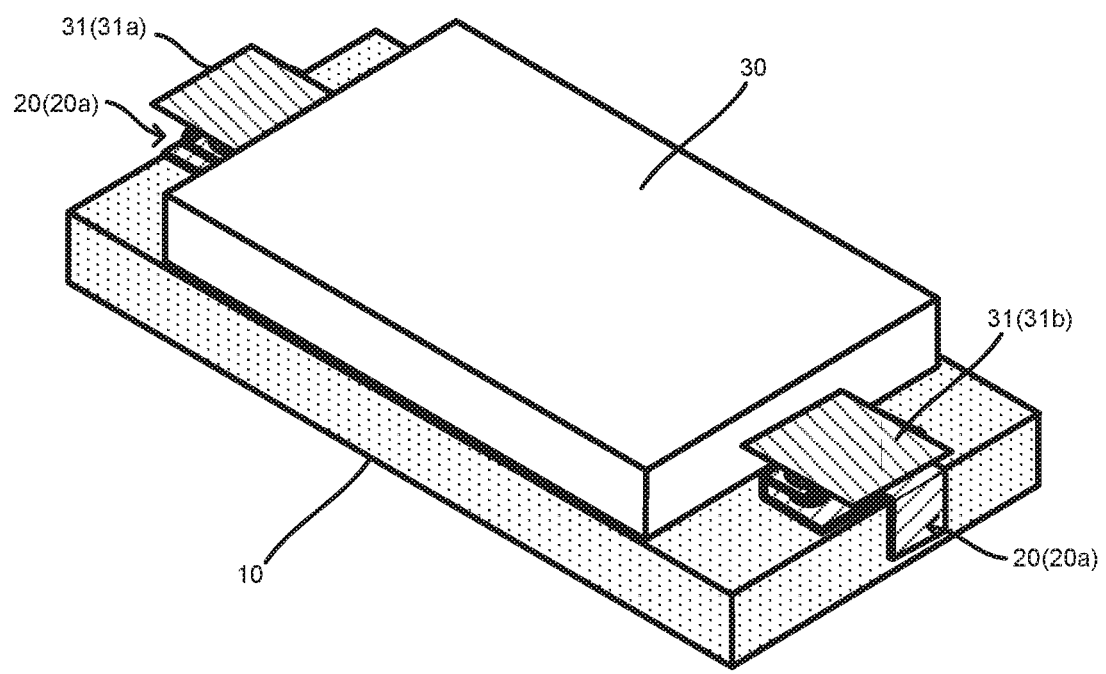
FIG. 9 is an explanatory schematic view of a step S3 in the production method S10.

In the step S3, the secondary battery 30 is stacked on the plate member 10. For example, as shown in FIG. 9, the secondary battery 30 is mounted on the plate member 10 so that the electrode terminal 31 of the secondary battery 30 is superimposed on the abutting part 22 of the conductive member 20 when viewed in the stacking direction.

1.6.4. Step S4

Figure 10:
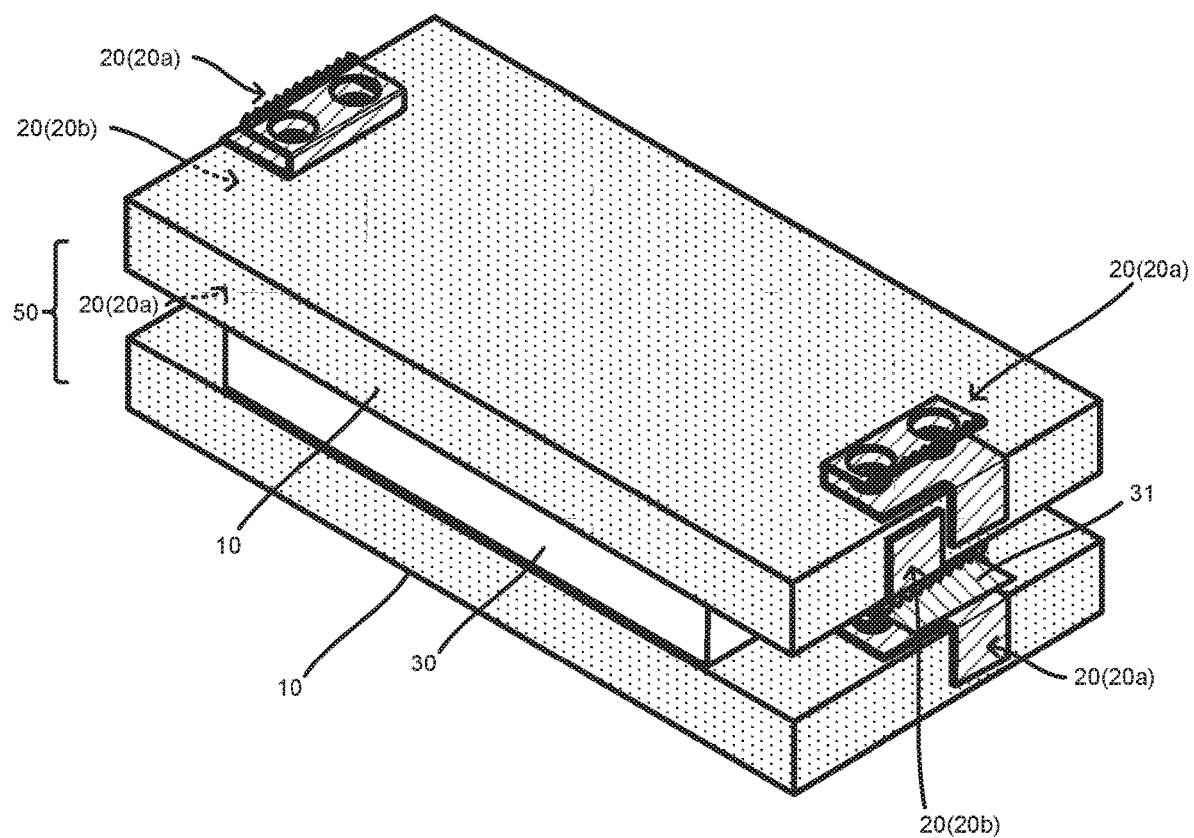
FIG. 10 is an explanatory schematic view of a step S4 in the production method S10.
Figure 11:
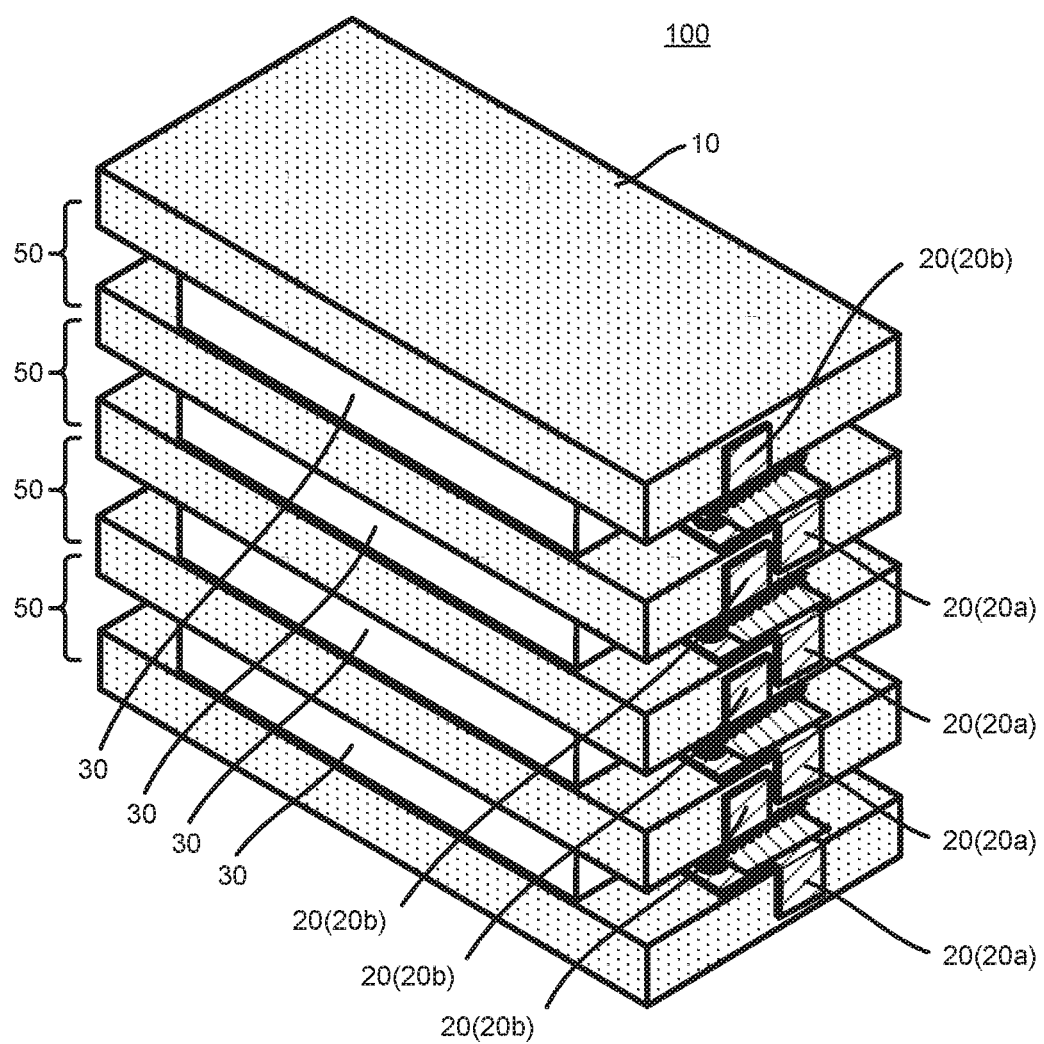
FIG. 11 is an explanatory schematic view of a structure of the secondary battery module 100 produced via the production method S10.

In the step S4, the electrode terminal 31 of the secondary battery 30 is held by the conductive member 20. For example, as shown in FIG. 10, the one plate member 10 to which the conductive member 20 or the component 20b is fixed (FIG. 8B), the secondary battery 30, and the other plate member 10 to which the conductive member 20 or the component 20a is fixed (FIG. 8C) are stacked so that the electrode terminal 31 of the secondary battery 30 is held by the conductive member 20 or the component 20b, which is provided for the one plate member 10 on one side, and the conductive member 20 or the component 20a, which is provided for the other plate member 10 on the other side. Thereby the stack unit 50 is formed. The secondary battery module 100 including a plurality of the stack units 50 as shown in FIG. 11 is obtained by repeating the steps S3 and S4. As shown in FIG. 6, after a plurality of the stack units 50 are stacked, pressure may be applied by the constraining member 60 in the stacking direction. One may slide the electrode terminal 31 after the step S4 to intentionally damage the surface of the electrode terminal 31 by friction between the conductive member 20 and the electrode terminal 31, which will be described in the third embodiment in detail.

2. Second Embodiment

Figure 12:
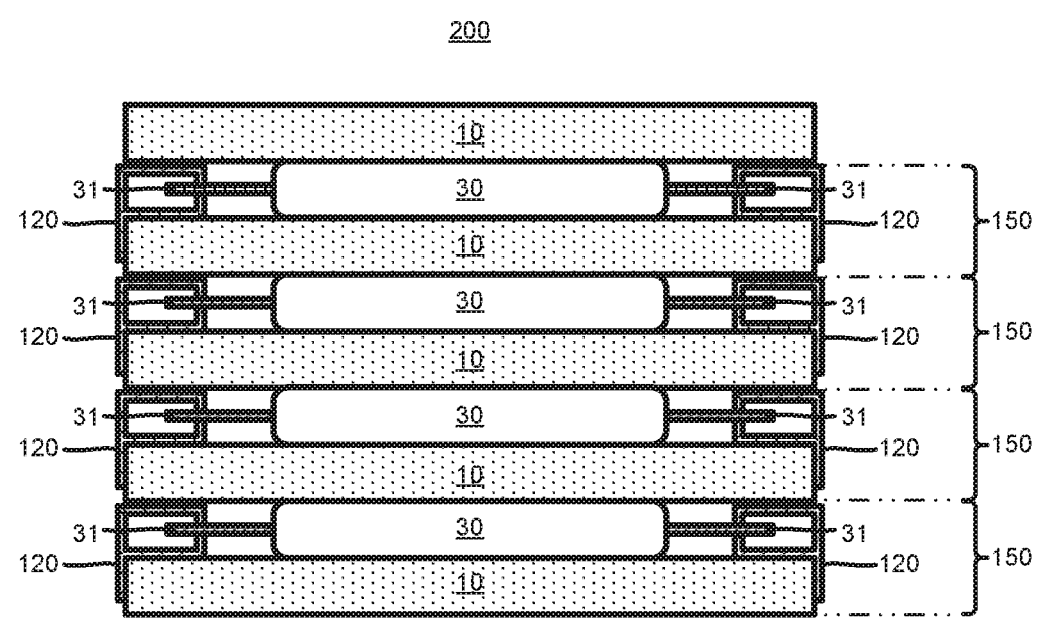
FIG. 12 is an explanatory schematic view of a structure of a secondary battery module 200.

FIG. 12 schematically shows the structure of a secondary battery module 200. In the secondary battery module 200, the members same as in the secondary battery module 100 are denoted by the same reference signs, and descriptions thereof are omitted accordingly. As shown in FIG. 12, the secondary battery module 200 includes a plurality of stack units 150. Each of the stack units 150 comprises: at least one non-conductive plate member 10; at least one conductive member 120 fixed to the plate member 10; the secondary battery 30 stacked on the plate member 10; and at least one electrode terminal 31 sticking out of the secondary battery 30, and held by the conductive member 120.

2.1. Conductive Member 120

Figure 13A:
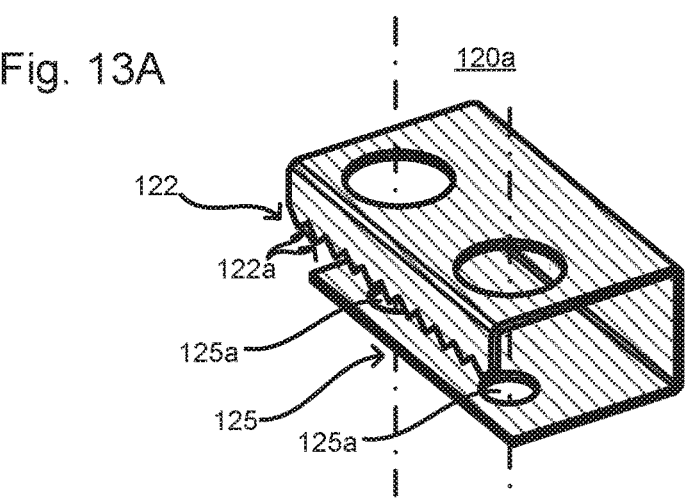
FIGS. 13A to 13C are explanatory schematic views of components of a conductive member 120.
Figure 13B:
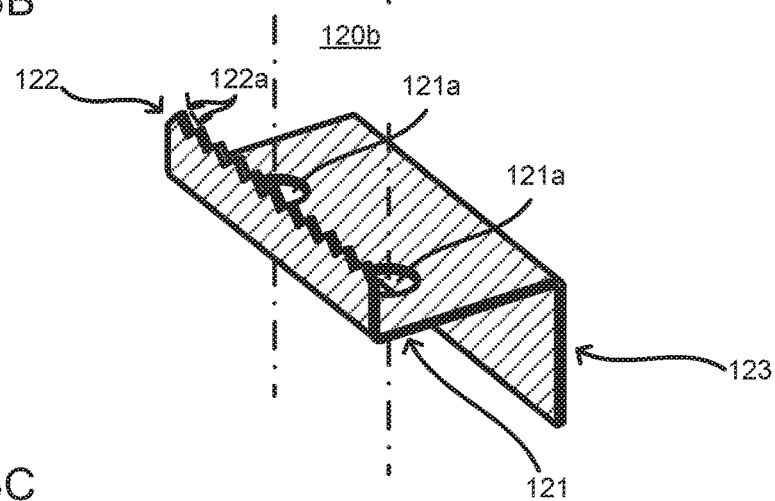
Figure 13C:
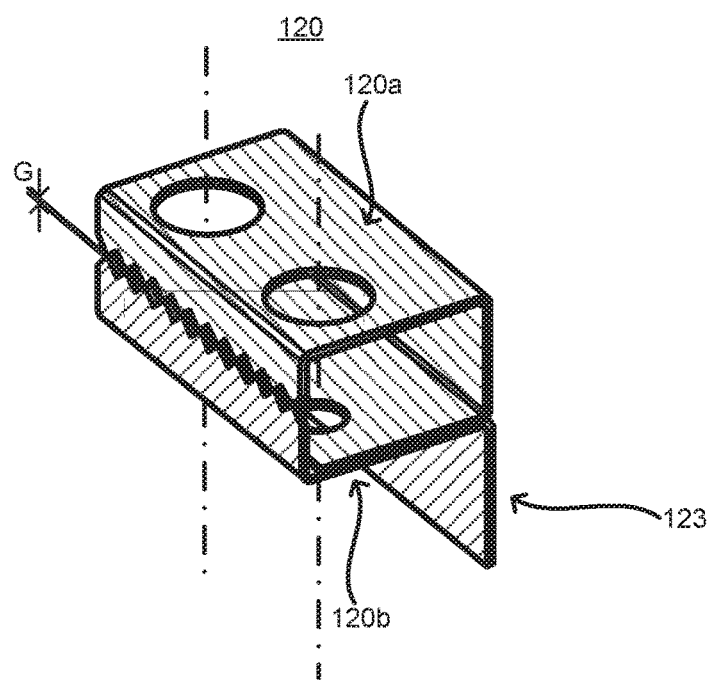
Figure 14:
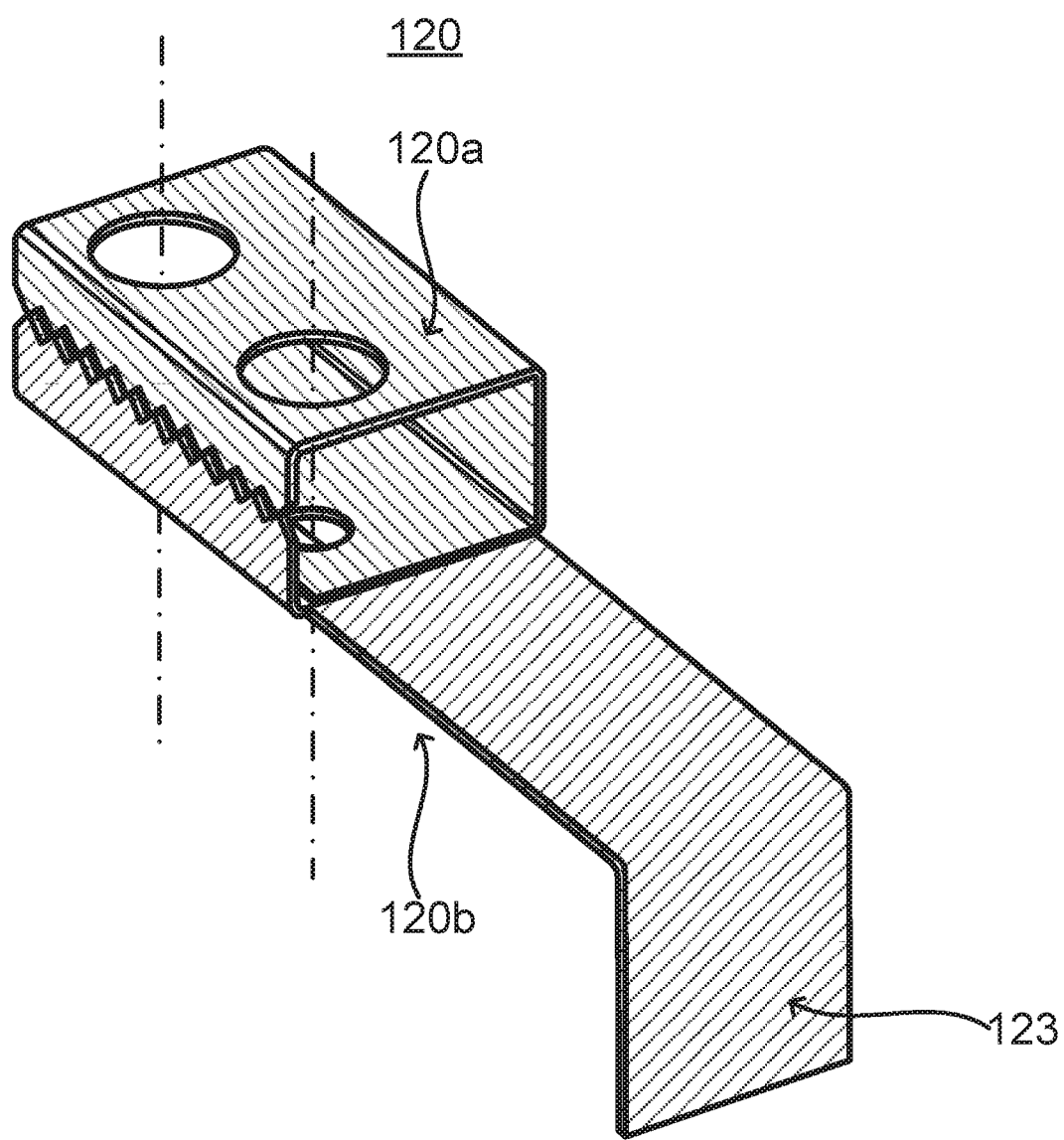
FIG. 14 is an explanatory schematic view of a variation of the conductive member 120.

The secondary battery module 200 is different from the secondary battery module 100 in inclusion of the conductive member 120 instead of the conductive member 20. FIGS. 13A to 13C schematically show one example of the conductive member 120. FIG. 14 schematically shows a variation of the conductive member 120. As shown in FIGS. 13A to 14, in the secondary battery module 200, one conductive member 120 to hold the electrode terminal 31 may be made up of a plurality of components 120a and 120b in combination. More specifically, as shown in FIGS. 13A to 14, one conductive member 120 to hold the electrode terminal 31 may include the component 120b that abuts one face of the electrode terminal 31, and the component 120a that abuts the other face of the electrode terminal 31. Constituting the conductive member 120 of a plurality of the components 120a and 120b as described above makes it possible to further easily hold the electrode terminal 31. Constituting the conductive member 120 of a plurality of the components 120a and 120b makes it easier to connect a terminal for voltage measurement to one of a plurality of the components 120a and 120b, and to connect a terminal for current measurement to the other thereof when the secondary battery 30 is charged/discharged by a charge/discharge device, as described later. This makes it possible to measure the voltage of each secondary battery with a high degree of accuracy, and to do a high-accuracy charge/discharge test.

As shown in FIGS. 12 to 14, in the secondary battery module 200, the conductive member 120 may be fixed only to one plate member 10 that is arranged on one side of the conductive member 120. In this case, while contacting the one plate member 10 arranged on the one side of the conductive member 120, the conductive member 120 does not necessarily contact another plate member 10 that is arranged on the other side thereof. Or, the conductive member 120 may be held between the plate members 10, 10 arranged on the one and the other sides thereof as fixed only to the plate member 10 arranged on the one side.

As shown in FIG. 13A, the component 120a constituting the conductive member 120 may have a fixing part 125 to be fixed to the component 120b. In this case, as shown in FIG. 13A, through holes 125a into which a fixing member such as a bolt and a screw is inserted may be provided for the fixing part 125 of the component 120a. The number of the through holes 125a is not particularly limited. A plurality of the through holes 125a may be provided in view of making firmer fixation possible.

As shown in FIG. 13B, the component 120b constituting the conductive member 120 may have a fixing part 121 to be fixed to the plate member 10. In this case, as shown in FIG. 13B, through holes 121a into which a fixing member such as a bolt and a screw is inserted may be provided for the fixing part 121 of the component 120b. The number of the through holes 121a is not particularly limited. A plurality of the through holes 121a may be provided in view of making firmer fixation possible.

As shown in FIGS. 13C and 14, the through holes 125a and 121a may be provided at approximately the same position when viewed in the stacking direction. Inserting a fixing member into the holes 10a of the plate member 10 via the through holes 125a and 121a provided at approximately the same position in the view in the stacking direction makes it possible to fix the components 120a and 120b, and the plate member 10 at the same time.

As shown in FIGS. 13A and 13B, the conductive member 120 may have an abutting part 122 to abut the electrode terminal 31 of the secondary battery 30. In this case, notches 122a may be provided for at least part of the abutting part 122. In other words, the conductive member 120 may have the notches 122a at a portion where the electrode terminal 31 is held. This makes it possible for the conductive member 120 to be partially lodged in the electrode terminal 31 when the conductive member 120 holds the electrode terminal 31. For example, even when the electrode terminal 31 has an oxide film over the surface thereof, the notches 122a of the conductive member 120 may break the oxide film over the surface of the electrode terminal 31 to lower the contact resistance of the conductive member 120 and the electrode terminal 31. Lowering the contact resistance of the conductive member 120 and the electrode terminal 31 may suppress heat generation at the holding part even when a large current flows. In addition, the performance of the secondary battery 30 is difficult to deteriorate when the secondary battery 30 is charged/discharged via the conductive member 120.

As shown in FIGS. 12 to 14, the conductive member 120 may have a shape able to be hook and hold the plate member 10. For example, as shown in FIGS. 13B to 14, the conductive member 120 may have a hooking part 123 to be arranged along a side face of the plate member 10. This makes it easier to position and fix the conductive member 120 at and to the plate member 10. When the secondary battery 30 is charged/discharged, a terminal of a charge/discharge device may be easily put onto the hooking part 123, which makes it easier to charge/discharge each secondary battery 30 without a conventional complex mechanism for opening and closing chuck units or the like, as described later. The aspect of the hooking part 123 in the conductive member 120 is not limited to those shown in FIGS. 13A to 14, and may be suitably changed according to the shape of the place where the conductive member 120 is fixed in the plate member 10.

The conductive member 120 is made of a conductive material. Specific examples of the conductive material include various metals. Holding the electrode terminal 31 of the secondary battery 30 by such a conductive member 120 made of a conductive material makes it possible to, for example, charge/discharge the secondary battery 30 via the conductive member 120. That is, the secondary battery 30 may be charged/discharged etc. as a terminal of a charge/discharge device is put onto the conductive member 120.

The number of the conductive members 120 fixed to the plate member 10 is not particularly limited, and may be suitably determined according to the number and the shape of the electrode terminals 31 of the secondary battery 30. The place where the conductive member 120 is fixed in the plate member 10 may be suitably determined as well according to the position of the electrode terminal 31 of the secondary battery 30 etc.

The aspect shown in FIGS. 13A to 14 is just one aspect of a conductive member which may be employed in the secondary battery module of the present disclosure. FIGS. 13A to 14 illustrate the aspect such that a side face of the conductive member 120 has an approximately U-shape, the notches 122a are provided inside an opening part of this approximate U-shape, and the hooking part 123 is provided for a portion different from the opening part of the approximate U-shape. The same function as the conductive member 120 may be secured by a different shape from the above. In the secondary battery module of the present disclosure, the way of fixing the conductive member to the plate member is not limited to fixing with a bolt or a screw as described above. Any fixing way such as fixing with a nut, fixing with an adhesive, and fixing by fitting may be employed. Fixing with a bolt or a screw is preferable in view of easier fixing.

2.2. Stack Unit 150

The stack unit 150 is formed of at least one plate member 10; at least one conductive member 120 fixed to the plate member 10; and the secondary battery 30 stacked on the plate member 10, and is formed by the conductive member 120 holding the electrode terminal 31 of the secondary battery 30. The method of producing the stack unit 150 will be described in detail later.

2.3. Other Structure

The secondary battery module 200 is formed by stacking a plurality of the stack units 150. For example, as shown in FIG. 12, one stack unit 150 on one side or the opposite side of the secondary battery 30 may be stacked on another stack unit 150 on the other side or the secondary battery 30 side so that the secondary battery 30 is held between two plate members 10, 10. The method of producing the secondary battery module 200 will be described in detail later.

FIG. 12 shows the embodiment of arranging the secondary battery 30 on each of a plurality of the stack units 150 only on the one side, to stack the stack units 150 in the same direction. The secondary battery module of the present disclosure is not limited to this embodiment. A plurality of the stack units 150 may be stacked so that the secondary batteries 30, 30 face each other.

FIG. 12 shows the embodiment of stacking the secondary battery 30 only on each of a plurality of the stack units 150 on the one side. The secondary battery module of the present disclosure is not limited to this embodiment. The secondary battery 30 may be stacked on both faces of the stack unit 150. In this case, the electrode terminal 31 may be held by the conductive member 120 of the secondary battery 30 stacked on the stack unit 150 on the other side, as well as that of the secondary battery 30 stacked thereon on the one side.

FIG. 12 further shows the embodiment of stacking a plurality of the stack units 150, 150, . . . so that they directly contact each other. The secondary battery module of the present disclosure is not limited to this embodiment. Some middle member may be held between a plurality of the stack units 150, 150, . . . . For example, a stack unit of a different aspect from the stack unit 150 may be held as long as the foregoing problems may be solved.

Like the secondary battery module 100, the secondary battery module 200 may include the constraining member 60. Specifically, a constraint pressure by the constraining member 60 may be applied to a plurality of the stack units 150, 150, . . . from both sides in the stacking direction. This makes the secondary battery module 200 easy to handle, and makes it expectable to lower the internal resistance of the battery due to the constraint pressure etc.

2.4. Method of Producing Secondary Battery Module 200

Figure 15:
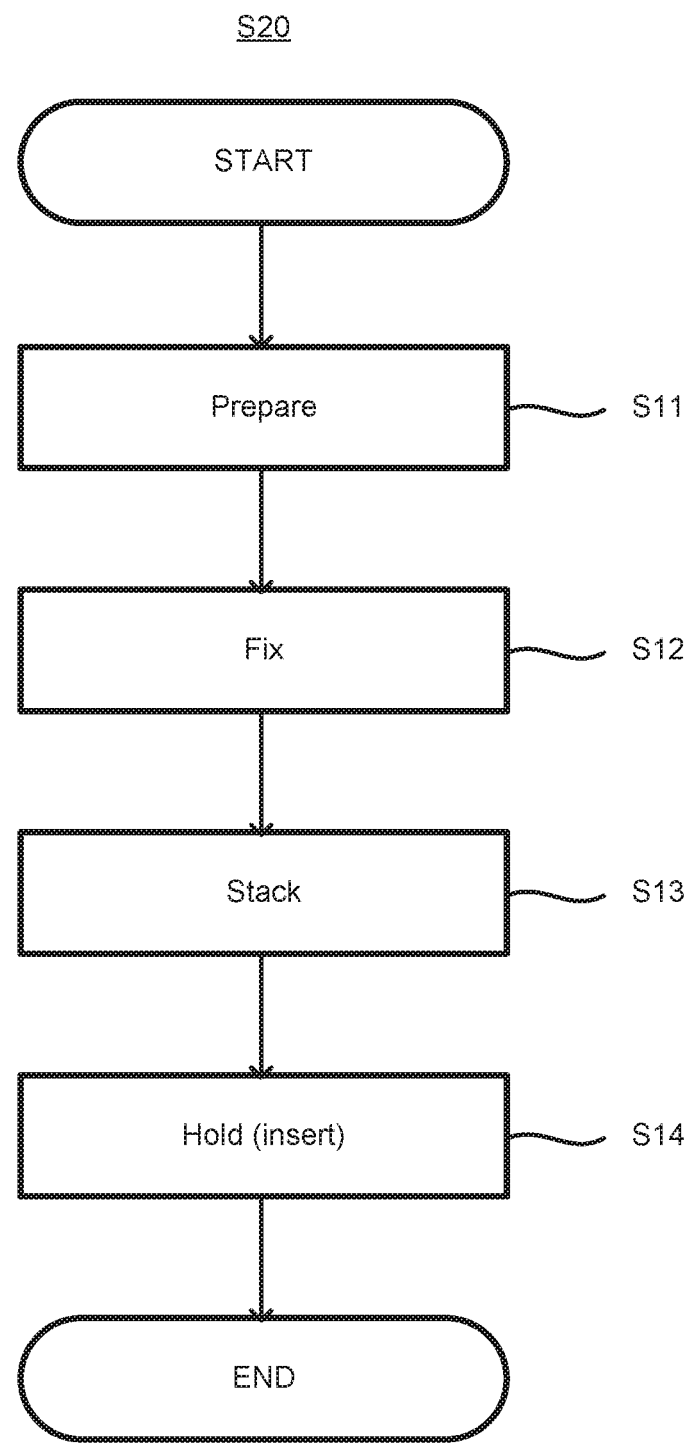
FIG. 15 is an explanatory flowchart of a method of producing the secondary battery module 200, or a production method S20.

One example of the method of producing the secondary battery module 200 will be described with reference to FIGS. 15 to 18. As shown in FIG. 15, the method of producing the secondary battery module 200 S20 includes a step S11 of preparing the non-conductive plate member 10, the conductive member 120, and the secondary battery 30, out of the secondary battery 30 the electrode terminal 31 sticking, a step S12 of fixing the conductive member 120 to the plate member 10, a step S13 of stacking the secondary battery 30 on the plate member 10, and a step S14 of holding, by the conductive member 120, the electrode terminal 31 of the secondary battery 30.

2.4.1. Step S11

In the step S11, the non-conductive plate member 10, the conductive member 120, and the secondary battery 30, out of which the electrode terminal 31 sticks are prepared. The structures of the plate member 10, conductive member 120, and secondary battery 30 are as described above, and descriptions thereof are omitted here.

2.4.2. Step S12

Figure 16:
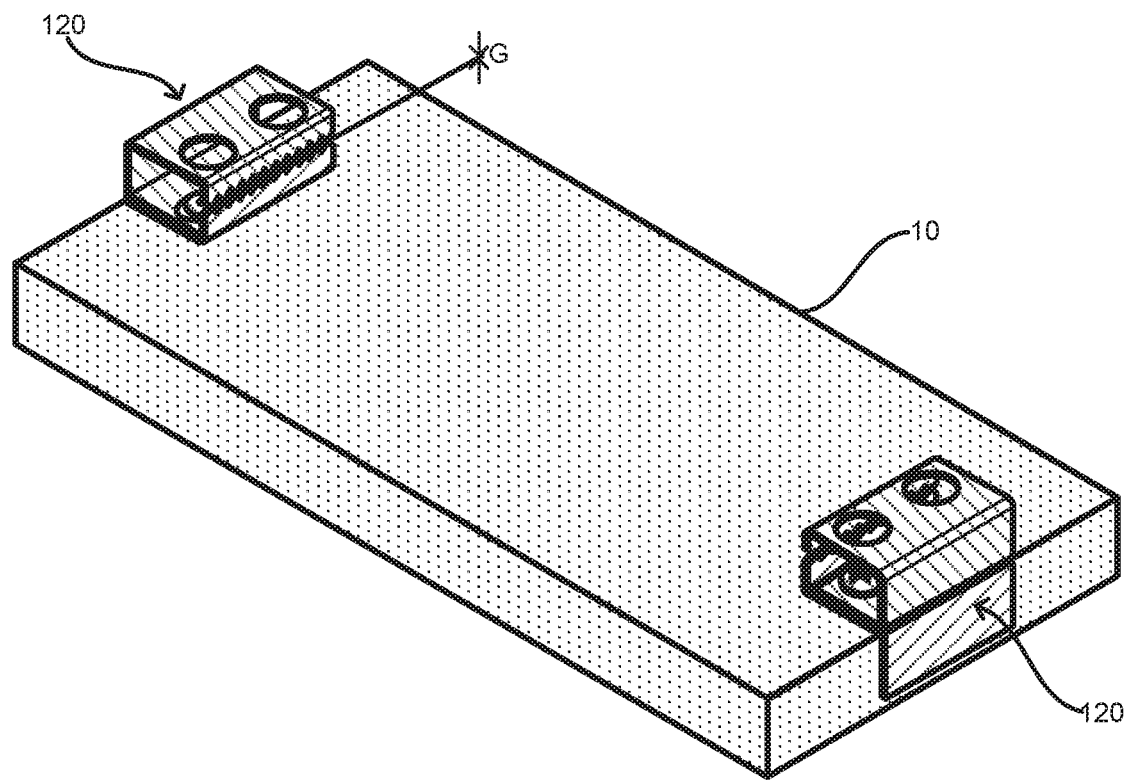
FIG. 16 is an explanatory schematic view of a step S12 in the production method S20.

In the step S12, the conductive member 120 is fixed to the plate member 10. For example, as shown in FIG. 16, after the conductive member 120 is arranged on the plate member 10 so that the holes 10a of the plate member 10 are superimposed on the through holes 121a and 125a of the conductive member 120, a fixing member of a bolt or a screw is inserted into the holes 10a and the through holes 121a and 125a, which makes it possible to fix the conductive member 120 at a desired position on the plate member 10. Or, as described above, the conductive member 120 may be fixed to the plate member 10 by a means other than a fixing member.

2.4.3. Step S13

Figure 17A:
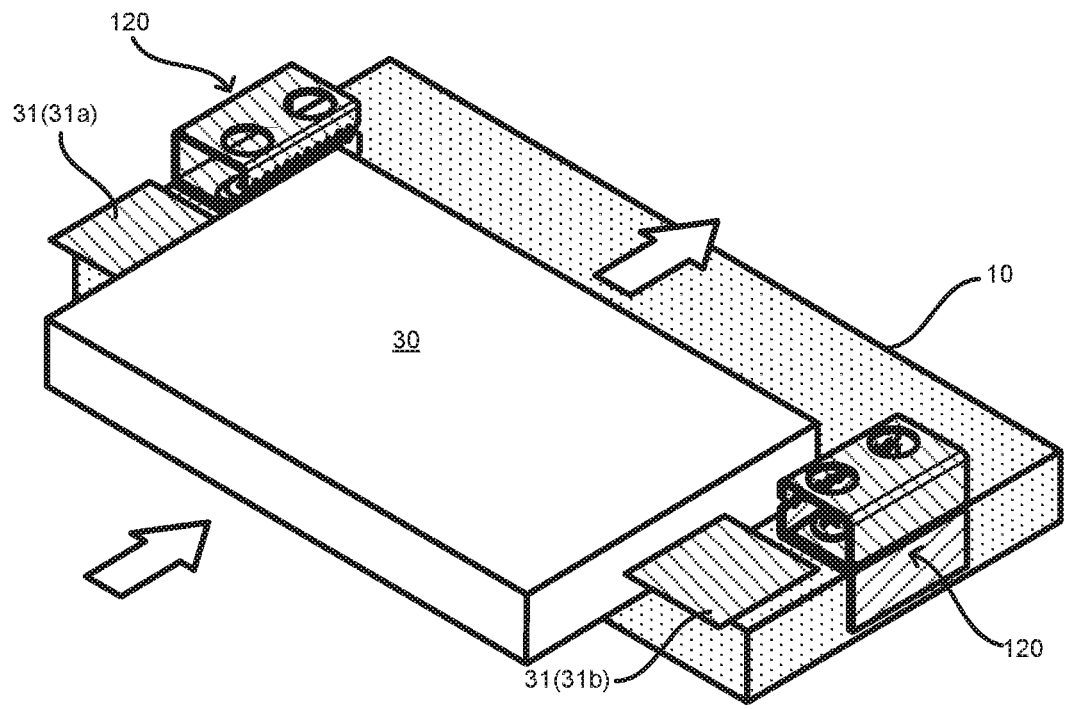
FIGS. 17A and 17B are explanatory schematic views of steps S13 and S14 in the production method S20.

In the step S3, the secondary battery 30 is stacked on the plate member 10. For example, as shown in FIGS. 17A and 17B, the secondary battery 30 is slid over the surface of the plate member 10, to mount the secondary battery 30 at a desired position on the plate member 10.

2.4.4. Step S14

In the step S14, the electrode terminal 31 of the secondary battery 30 is held by the conductive member 120. For example, when the conductive member 120 having a gap G whose width is narrower than the thickness of the electrode terminal 31 is prepared as a conductive member, inserting the electrode terminal 31 into the gap G of the conductive member 120 makes it possible for the conductive member 120 to hold the electrode terminal 31 as shown in FIGS. 17A and 17B. When the width of the gap G of the conductive member 120 is narrower than the thickness of the electrode terminal 31, the surface of the electrode terminal 31 may be partially damaged, or shaved in the insertion of the electrode terminal 31 into the gap G. For example, even when oxide film is formed over the surface of the electrode terminal 31, the insertion of the electrode terminal 31 makes it possible to remove the oxide film, to lower the contact resistance of the conductive member 120 and the electrode terminal 31. Lowering the contact resistance of the conductive member 120 and the electrode terminal 31 may suppress heat generation at the holding part even when a large current flows. In addition, the performance of the secondary battery 30 is difficult to deteriorate when the secondary battery 30 is charged/discharged via the conductive member 120.

Figure 17B:
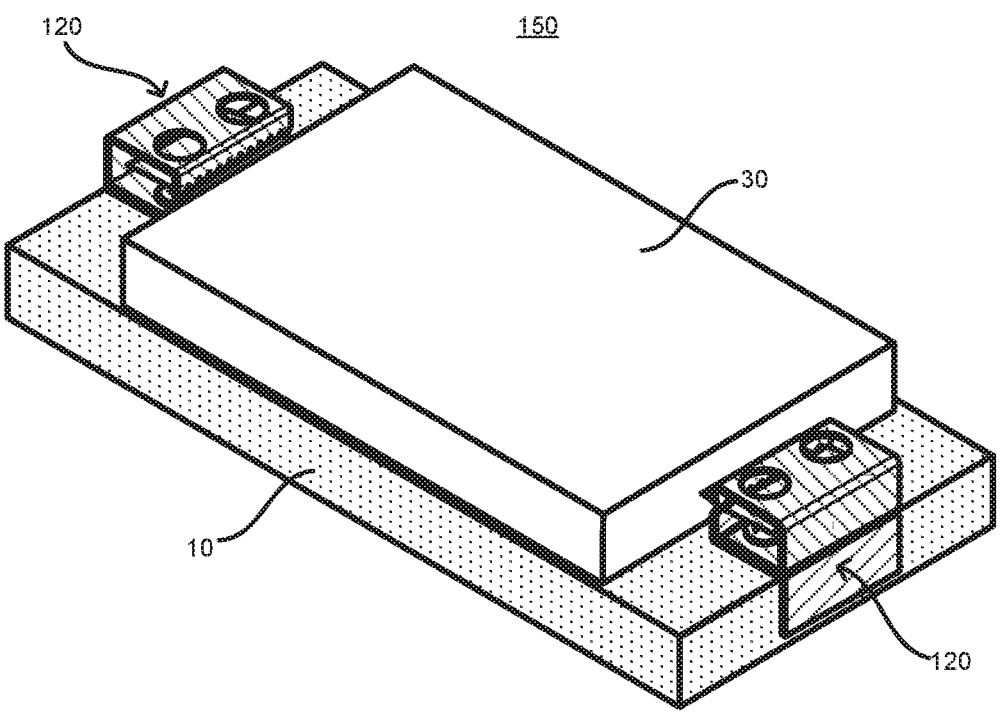
Figure 18:
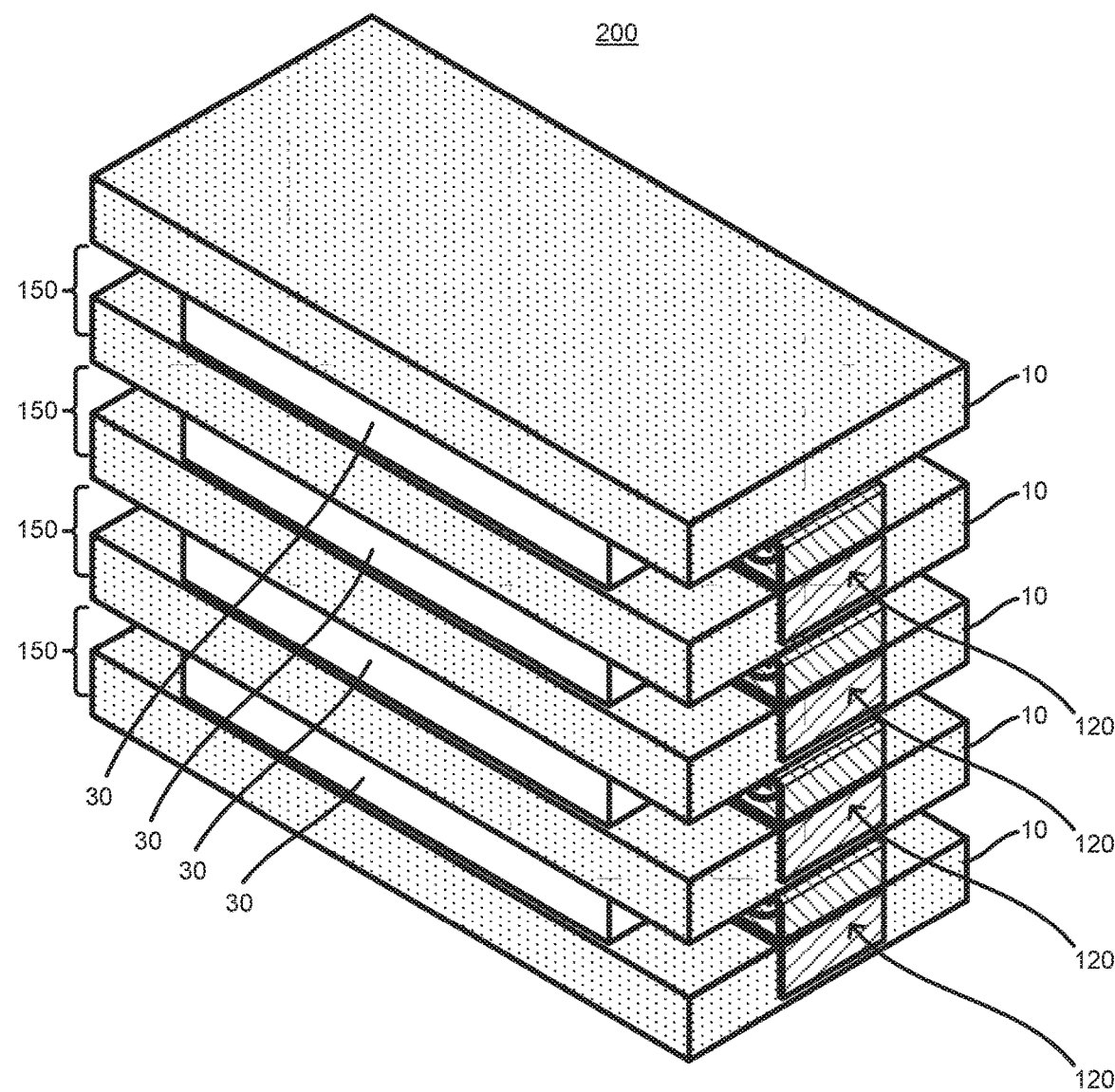
FIG. 18 is an explanatory schematic view of a structure of the secondary battery module 200 produced via the production method S20.

As shown in FIG. 17B, the stack unit 150 is obtained via the steps S11 to 14. The secondary battery module 200 as shown in FIG. 18 is obtained by stacking a plurality of the stack units 150. Like the secondary battery module 100 shown in FIG. 6, after a plurality of the stack units 150 are stacked, pressure may be applied in the stacking direction by the constraining member 60 as well when the secondary battery module 200 is produced.

3. Third Embodiment

Figure 19:
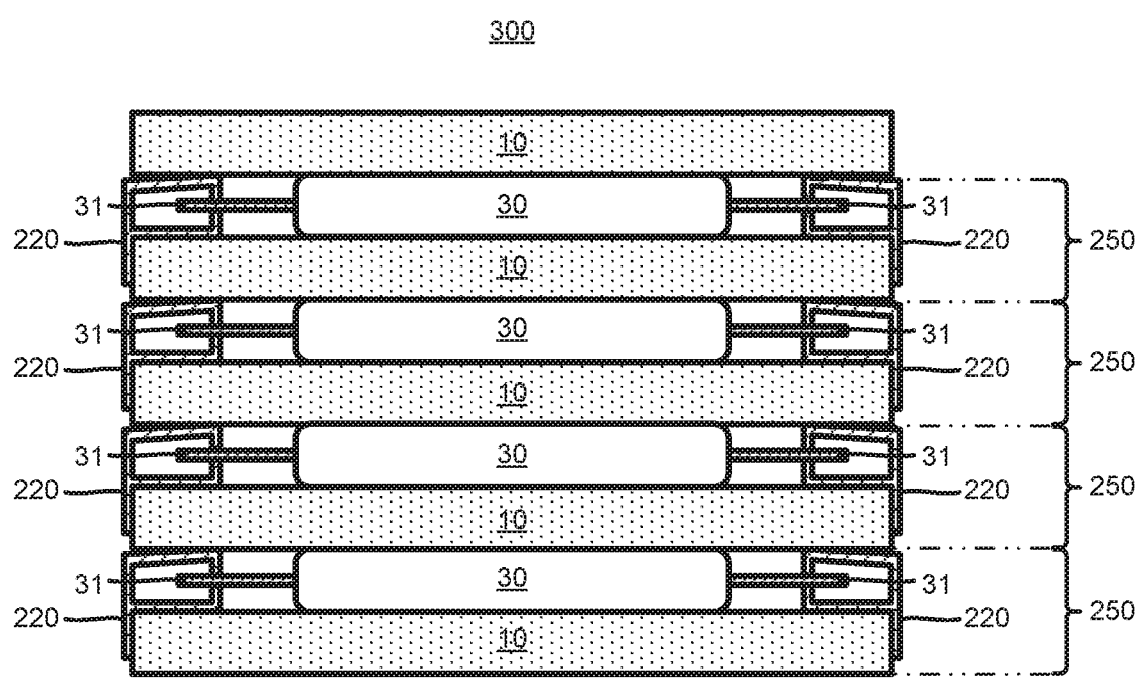
FIG. 19 is an explanatory schematic view of a structure of a secondary battery module 300.

The second embodiment has illustrated the secondary battery module 200 including the conductive member 120 having the gap G whose width is narrower than the thickness of the electrode terminal 31. The secondary battery module of the present disclosure is however not limited to this embodiment. The secondary battery module may be formed by using a conductive member having a gap G wider than the thickness of the electrode terminal 31. FIG. 19 schematically shows the structure of a secondary battery module 300. In the secondary battery module 300, the members same as in the secondary battery module 100 are denoted by the same reference signs, and descriptions thereof are omitted accordingly. As shown in FIG. 19, the secondary battery module 300 includes a plurality of stack units 250. Each of the stack units 250 comprises: at least one non-conductive plate member 10; at least one conductive member 220 fixed to the plate member 10; the secondary battery 30 stacked on the plate member 10; and at least one electrode terminal 31 sticking out of the secondary battery 30, and held by the conductive member 220.

3.1. Conductive Member 220

Figure 20A:
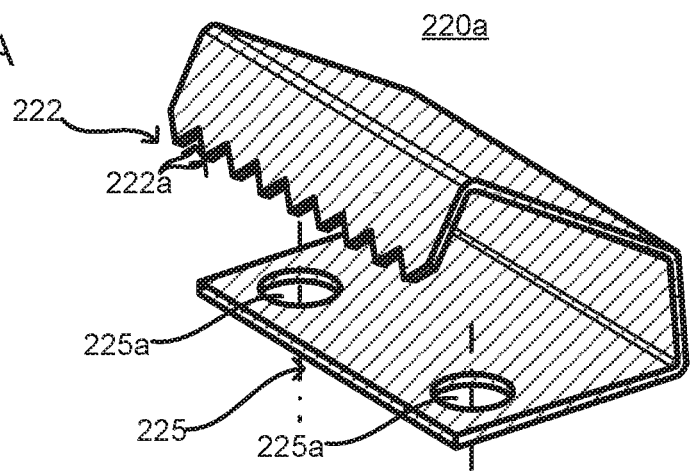
FIGS. 20A to 20C are explanatory schematic views of components of a conductive member 220.
Figure 20B:
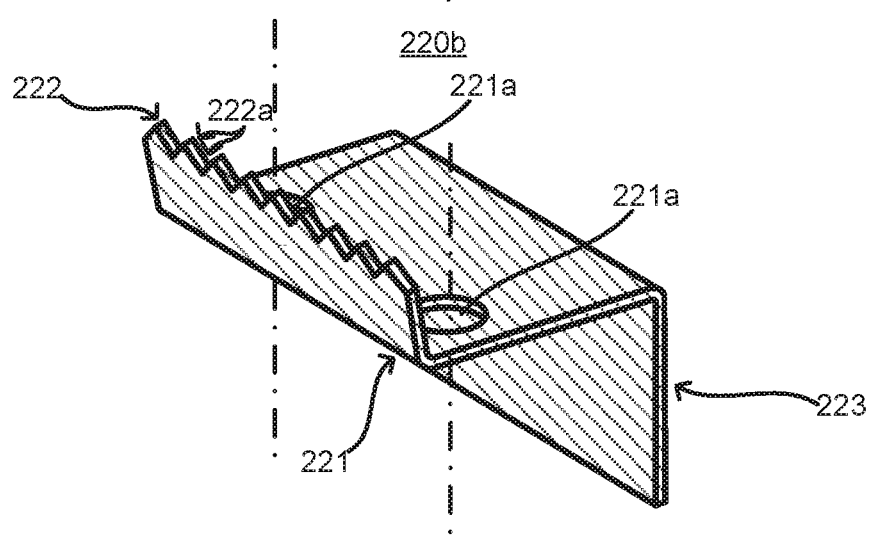
Figure 20C:
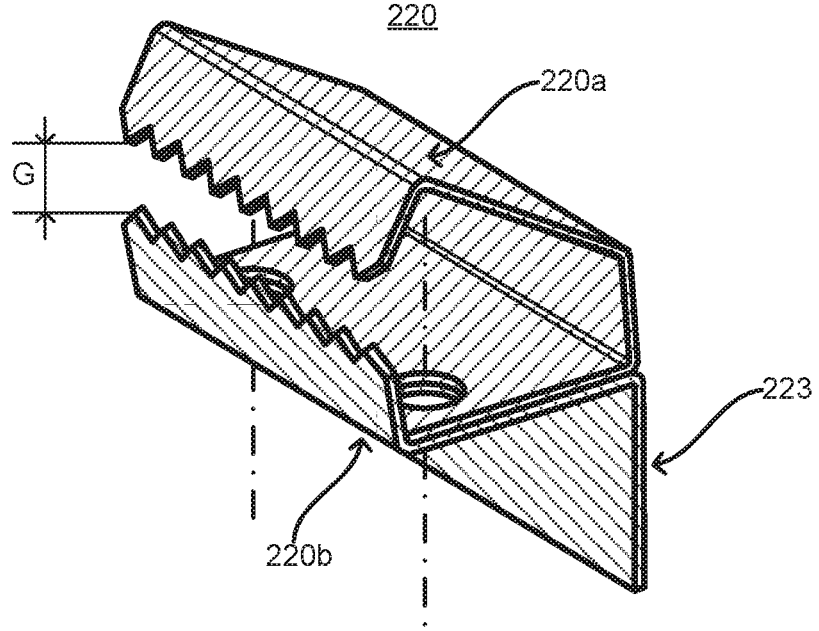
Figure 21:
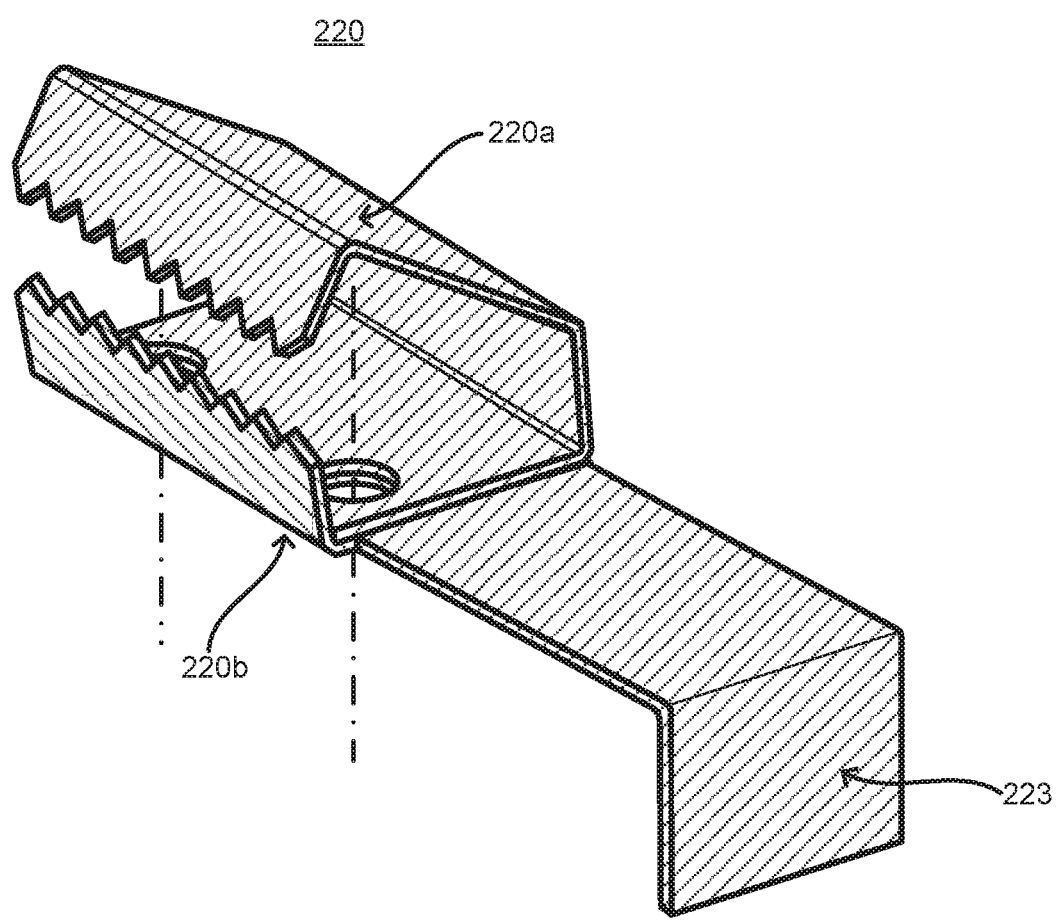
FIG. 21 is an explanatory schematic view of a variation of the conductive member 220.

The secondary battery module 300 is different from the secondary battery module 100 in inclusion of the conductive member 220 instead of the conductive member 20. FIGS. 20A to 20C schematically show one example of the conductive member 220. FIG. 21 schematically shows a variation of the conductive member 220. As shown in FIGS. 20A to 21, in the secondary battery module 300, one conductive member 220 to hold the electrode terminal 31 may be made up of a plurality of components 220a and 220b in combination. More specifically, as shown in FIGS. 20A to 21, one conductive member 220 to hold the electrode terminal 31 may include the component 220b that abuts one face of the electrode terminal 31, and the component 220a that abuts the other face of the electrode terminal 31. Constituting the conductive member 220 of a plurality of the components 220a and 220b as described above makes it possible to further easily hold the electrode terminal 31. Constituting the conductive member 220 of a plurality of the components 220a and 220b makes it easy to connect a terminal for voltage measurement to one of a plurality of the components 220a and 220b, and to connect a terminal for current measurement to the other thereof when the secondary battery 30 is charged/discharged by a charge/discharge device, as described later. This makes it possible to measure the voltage of each secondary battery with a high degree of accuracy, and to do a high-accuracy charge/discharge test.

As shown in FIGS. 19 to 21, in the secondary battery module 300, the conductive member 220 may be fixed only to one plate member 10 that is arranged on one side of the conductive member 220. Here, as shown in FIG. 19, the conductive member 220 contacts both the one plate member 10 arranged on the one side of the conductive member 220, and another plate member 10 arranged on the other side thereof. That is, the conductive member 220 is held by the plate members 10, 10 arranged on the one and the other sides thereof, and pressure by this holding narrows the gap G of the conductive member 220 to at least the thickness of the electrode terminal 31. The secondary battery module 300 shown in FIG. 19 may be structured so that pressure is applied to the conductive member 220, and stopping applying the pressure may release the conductive member 220 from holding the electrode terminal 31. This makes it easier to adjust the place where the electrode terminal 31 is held by the conductive member 220.

As shown in FIG. 20A, the component 220a constituting the conductive member 220 may have a fixing part 225 to be fixed to the component 220b. In this case, as shown in FIG. 20A, through holes 225a into which a fixing member such as a bolt and a screw is inserted may be provided for the fixing part 225 of the component 220a. The number of the through holes 225a is not particularly limited. A plurality of the through holes 225a may be provided in view of making firmer fixation possible.

As shown in FIG. 20B, the component 220b constituting the conductive member 220 may have a fixing part 221 to be fixed to the plate member 10. In this case, as shown in FIG. 20B, through holes 221a into which a fixing member such as a bolt and a screw is inserted may be provided for the fixing part 221 of the component 220b. The number of the through holes 221a is not particularly limited. A plurality of the through holes 221a may be provided in view of making firmer fixation possible.

As shown in FIGS. 20C and 21, the through holes 225a and 221a may be provided at approximately the same position when viewed in the stacking direction. Inserting a fixing member into the holes 10a of the plate member 10 via the through holes 225a and 221a provided at approximately the same position in view in the stacking direction makes it possible to fix the components 220a and 220b, and the plate member 10 at the same time.

As shown in FIGS. 20A and 20B, the conductive member 220 may have an abutting part 222 to abut the electrode terminal 31 of the secondary battery 30. In this case, notches 222a may be provided for at least part of the abutting part 222. In other words, the conductive member 220 may have the notches 222a at a portion where the electrode terminal 31 is held. This makes it possible for the conductive member 120 to be partially lodged in the electrode terminal 31 when the conductive member 120 holds the electrode terminal 31. For example, even when the electrode terminal 31 has an oxide film over the surface thereof, the notches 222a of the conductive member 220 may break the oxide film over the surface of the electrode terminal 31 to lower the contact resistance of the conductive member 220 and the electrode terminal 31. Lowering the contact resistance of the conductive member 220 and the electrode terminal 31 may suppress heat generation at the holding part even when a large current flows. In addition, the performance of the secondary battery 30 is difficult to deteriorate when the secondary battery 30 is charged/discharged via the conductive member 220.

As shown in FIGS. 19 to 21, the conductive member 220 may have a shape able to be hook and hold the plate member 10. For example, as shown in FIGS. 20B to 21, the conductive member 220 may have a hooking part 223 to be arranged along a side face of the plate member 10. This makes it easier to position and fix the conductive member 220 at and to the plate member 10. When the secondary battery 30 is charged/discharged, a terminal of a charge/discharge device may be easily put onto the hooking part 223, which makes it easier to charge/discharge each secondary battery 30 without a conventional complex mechanism for opening and closing chuck units or the like, as described later. The aspect of the hooking part 223 in the conductive member 220 is not limited to those shown in FIGS. 20A to 21, and may be suitably changed according to the shape of the place where the conductive member 220 is fixed in the plate member 10.

The conductive member 220 is made of a conductive material. Specific examples of the conductive material include various metals. Holding the electrode terminal 31 of the secondary battery 30 by such a conductive member 220 made of a conductive material makes it possible to, for example, charge/discharge the secondary battery 30 via the conductive member 220. That is, the secondary battery 30 may be charged/discharged etc. as a terminal of a charge/discharge device is put onto the conductive member 220.

The number of the conductive members 220 fixed to the plate member 10 is not particularly limited, and may be suitably determined according to the number and the shape of the electrode terminals 31 of the secondary battery 30. The place where the conductive member 220 is fixed in the plate member 10 may be suitably determined as well according to the position of the electrode terminal 31 of the secondary battery 30 etc.

The aspect shown in FIGS. 20A to 21 is just one aspect of a conductive member that may be employed in the secondary battery module of the present disclosure. In the secondary battery module of the present disclosure, the way of fixing the conductive member to the plate member is not limited to fixing with a bolt or a screw as described above. Any fixing way such as fixing with a nut, fixing with an adhesive, and fixing by fitting may be employed. Fixing with a bolt or a screw is preferable in view of easier fixing.

3.2. Stack Unit 250

The stack unit 250 is formed of at least one plate member 10; at least one conductive member 220 fixed to the plate member 10; and the secondary battery 30 stacked on the plate member 10, and is formed by the conductive member 220 holding the electrode terminal 31 of the secondary battery 30. The method of producing the stack unit 250 will be described in detail later.

3.3. Other Structure

The secondary battery module 300 is formed by stacking a plurality of the stack units 250. For example, as shown in FIG. 19, one stack unit 250 on one side or the opposite side of the secondary battery 30 may be stacked on another stack unit 250 on the other side or the secondary battery 30 side so that the secondary battery 30 is held between two plate members 10, 10. The method of producing the secondary battery module 300 will be described in detail later.

FIG. 19 shows the embodiment of arranging the secondary battery 30 on each of a plurality of the stack units 250 only on the one side, to stack the stack units 250 in the same direction. The secondary battery module of the present disclosure is not limited to this embodiment. A plurality of the stack units 250 may be stacked so that the secondary batteries 30, 30 face each other.

FIG. 19 shows the embodiment of stacking the secondary battery 30 only on each of a plurality of the stack units 250 on the one side. The secondary battery module of the present disclosure is not limited to this embodiment. The secondary battery 30 may be stacked on both faces of the stack unit 250. In this case, the electrode terminal 31 may be held by the conductive member 220 in the secondary battery 30 stacked on the stack unit 250 on the other side, as well as in the secondary battery 30 stacked thereon on the one side.

FIG. 19 further shows the embodiment of stacking a plurality of the stack units 250, 250, . . . so that they directly contact each other. The secondary battery module of the present disclosure is not limited to this embodiment. Some middle member may be held between a plurality of the stack units 250, 250, . . . . For example, a stack unit of a different aspect from the stack unit 250 may be held as long as the foregoing problems may be solved.

Like the secondary battery module 100, the secondary battery module 300 may include the constraining member 60. Specifically, a constraint pressure by the constraining member 60 may be applied to a plurality of the stack units 250, 250, . . . from both sides in the stacking direction. This makes it possible for the conductive member 220 to more firmly hold the electrode terminal 31 to further lower the contact resistance of the conductive member 220 and the electrode terminal 31. This also makes the secondary battery module 300 easy to handle, and makes it expectable to lower the internal resistance of the battery due to the constraint pressure etc.

3.4. Method of Producing Secondary Battery Module 300

Figure 22:
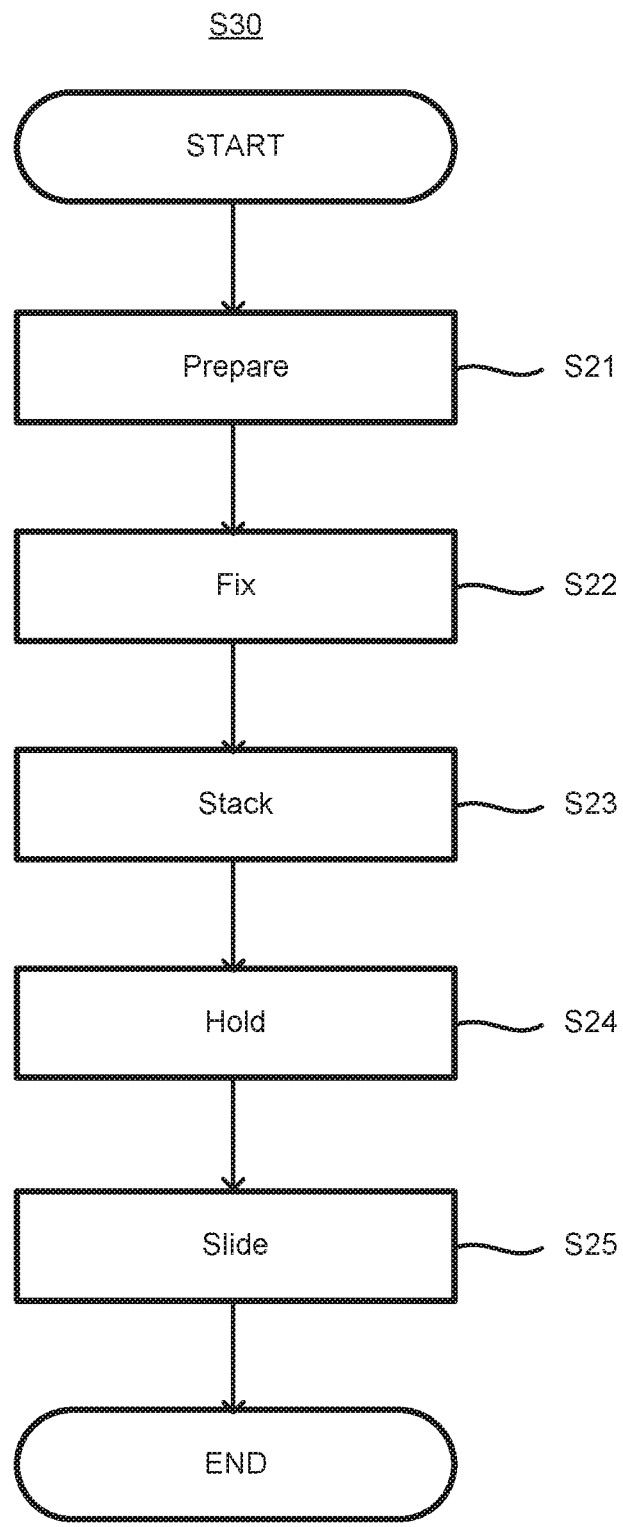
FIG. 22 is an explanatory flowchart of a method of producing the secondary battery module 300, or a production method S30.

One example of the method of producing the secondary battery module 300 will be described with reference to FIGS. 22 to 27C. As shown in FIG. 22, the method of producing the secondary battery module 300 S30 includes a step S21 of preparing the non-conductive plate member 10, the conductive member 220, and the secondary battery 30, out of the secondary battery 30 the electrode terminal 31 sticking, a step S22 of fixing the conductive member 220 to the plate member 10, a step S23 of stacking the secondary battery 30 on the plate member 10, and a step S24 of holding, by the conductive member 220, the electrode terminal 31 of the secondary battery 30. As shown in FIG. 22, the production method S30 may include a step S25 of sliding the electrode terminal 31 after the electrode terminal 31 is held by the conductive member 220.

3.4.1. Step S21

In the step S21, the non-conductive plate member 10, the conductive member 220, and the secondary battery 30 out of which the electrode terminal 31 sticks are prepared. The structures of the plate member 10, conductive member 220, and secondary battery 30 are as described above, and descriptions thereof are omitted here.

3.4.2. Step S22

Figure 23:
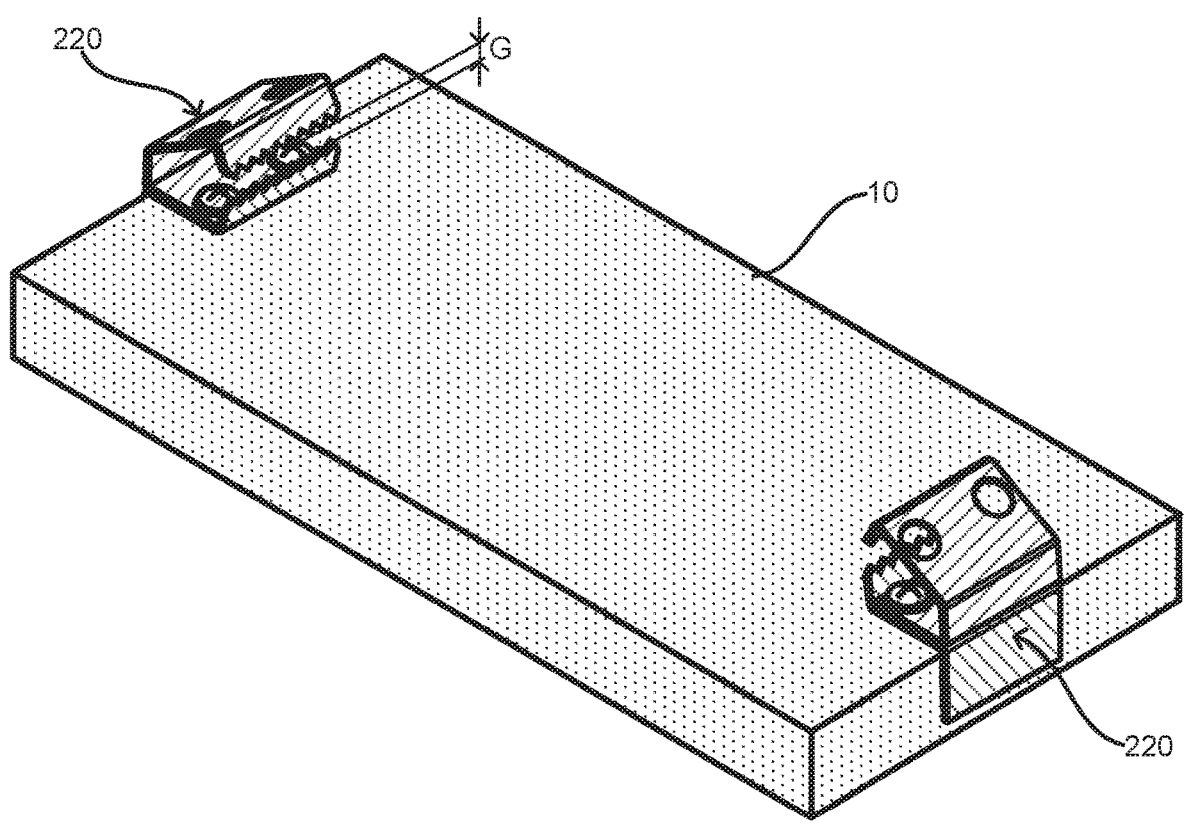
FIG. 23 is an explanatory schematic view of a step S22 in the production method S30.

In the step S22, the conductive member 220 is fixed to the plate member 10. For example, as shown in FIG. 23, after the conductive member 220 is arranged on the plate member 10 so that the holes 10a of the plate member 10 are superimposed on the through holes 221a and 225a of the conductive member 220, a fixing member of a bolt or a screw is inserted into the holes 10a and the through holes 221a and 225a, which makes it possible to fix the conductive member 220 at a desired position on the plate member 10. Or, as described above, the conductive member 220 may be fixed to the plate member 10 by a means other than a fixing member.

3.4.3. Step S23

Figure 24A:
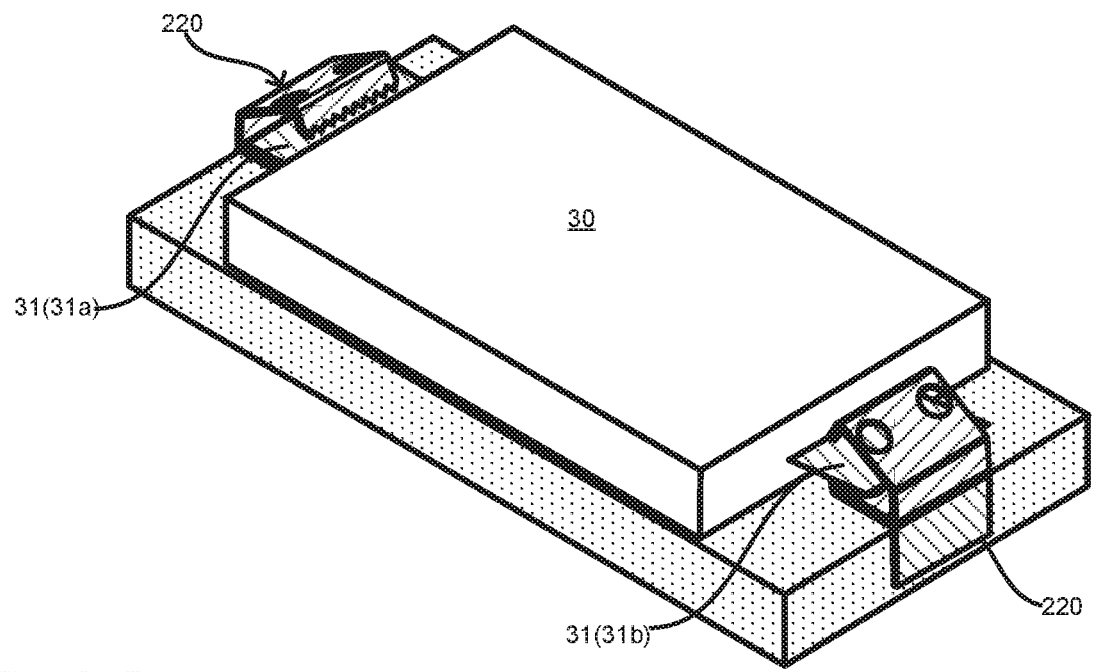
FIGS. 24A to 24C are explanatory schematic views of a step S23 in the production method S30.

In the step S23, the secondary battery 30 is stacked on the plate member 10. For example, as shown in FIGS. 24A and 24B, the secondary battery 30 is mounted on the plate member 10 as the electrode terminal 31 of the secondary battery 30 is arranged in the gap G of the abutting part 222 of the conductive member 220 when viewed in the stacking direction.

Figure 24B:
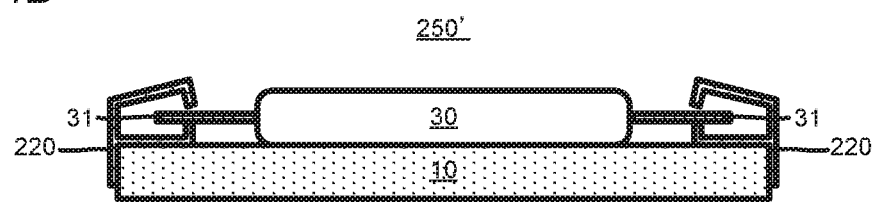
Figure 24C:
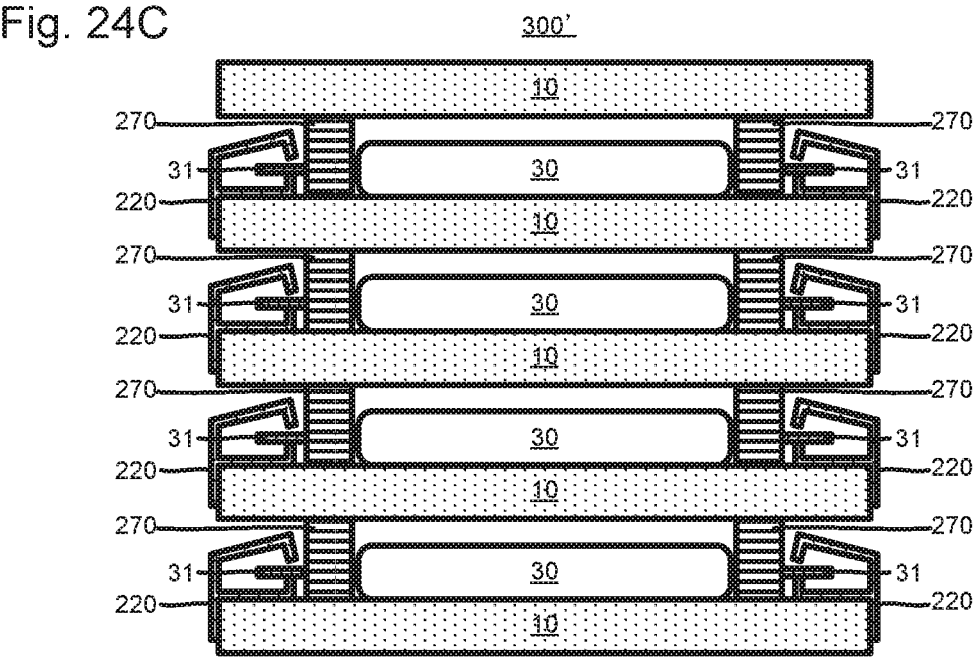

As shown in FIGS. 24B and 24C, in the step S23, one may stack the secondary battery 30 on each of a plurality of the plate members 10 to make a plurality of stacks 250', and stack these stacks 250' in order, to obtain a multiple stack 300'. In this case, as shown in FIG. 24C, a plurality of the stacks 250' may be stacked via supporting members 270 such as springs and bracing members so that pressure is not applied to the conductive member 220 in each stack 250', so that a plurality of the stacks 250' are formed at predetermined intervals in the multiple stack 300'. The position of each supporting member 270 is not particularly limited. For example, the supporting member 270 may be arranged between one plate member 10 and another plate member 10 so as to support the one plate member 10 on one side and the other plate member 10 on the other side. For example, a spring or the like as the supporting member 270 may be wound around the bar 60b that is between the one plate member 10 and the other plate member 10 after the bar 60b of the constraining member 60 is made to penetrate the plate members 10, to arrange the bar 60b. The supporting member 270 may be provided so as to be detachable from the multiple stack 300', or may remain as a part of the secondary battery module 300 as, for example, being wound around the bar 60b of the constraining member 60 as described above.

3.4.4. Step S24

Figure 25A:
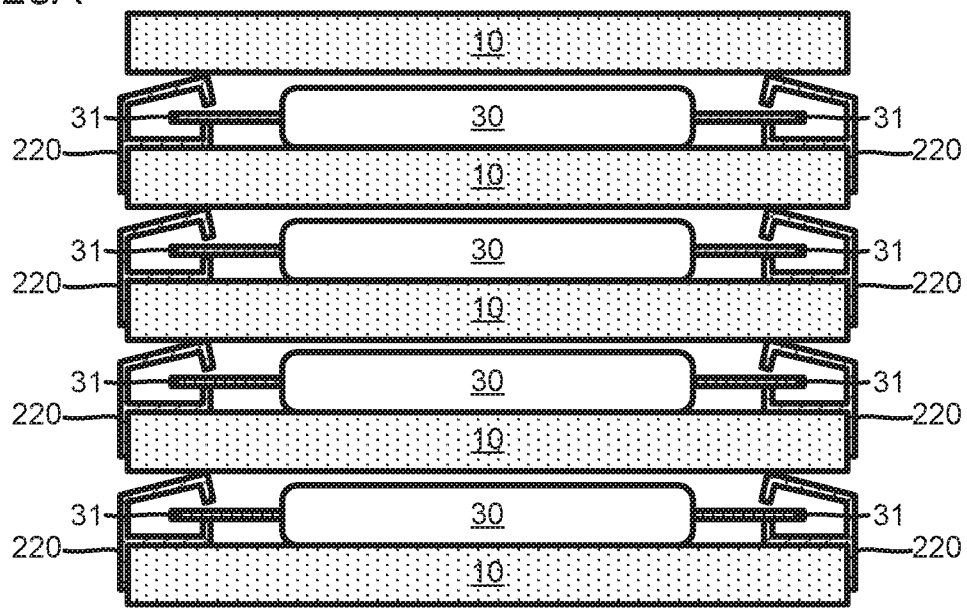
FIGS. 25A and 25B are explanatory schematic views of a step S24 in the production method S30.
Figure 25B:
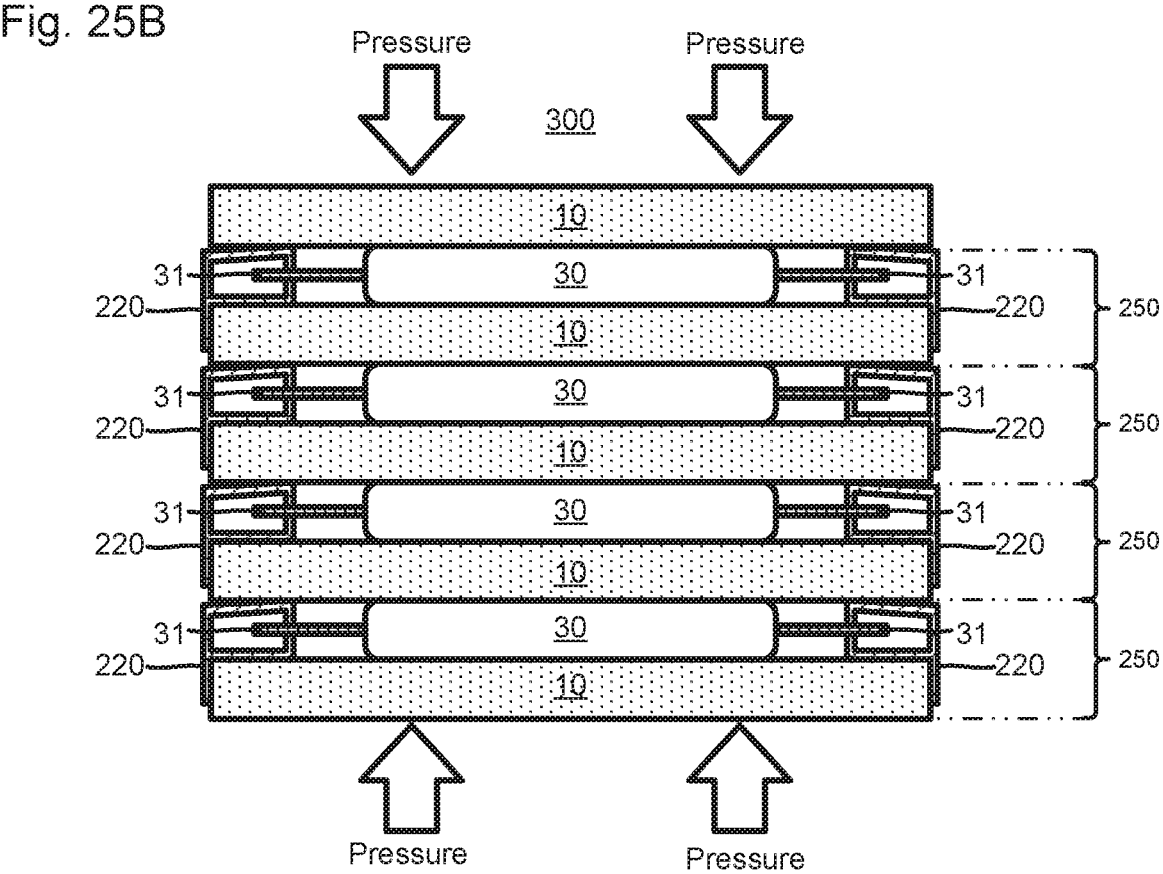
Figure 26A:
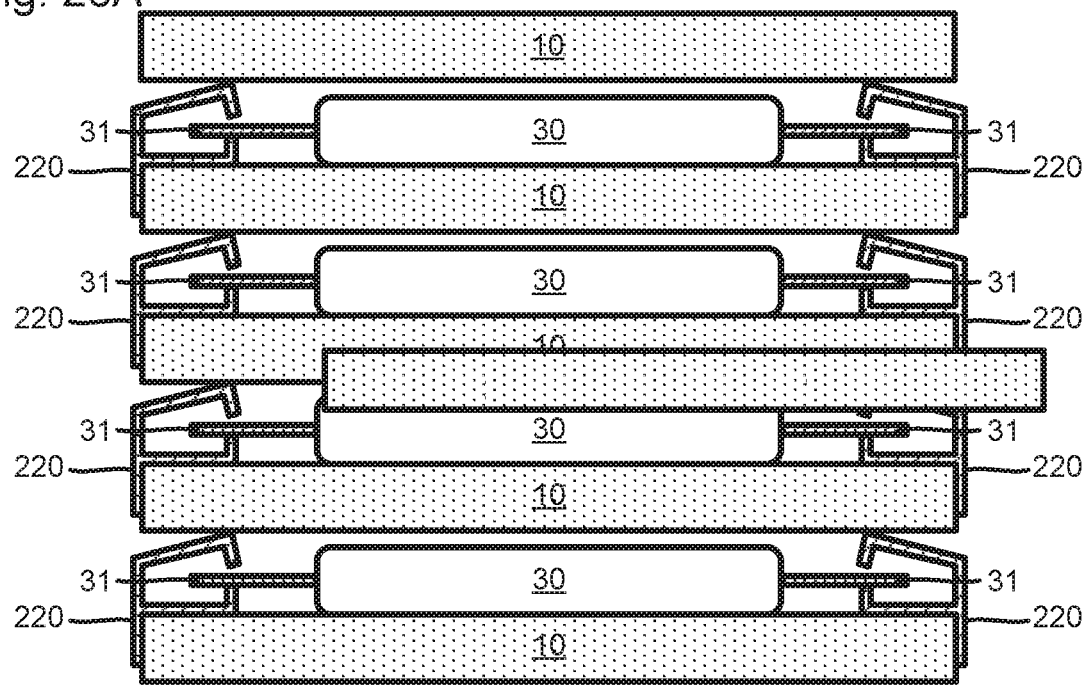
FIGS. 26A and 26B are explanatory schematic views of one example of a mode of the module just before the step S24 in the production method S30.
Figure 26B:
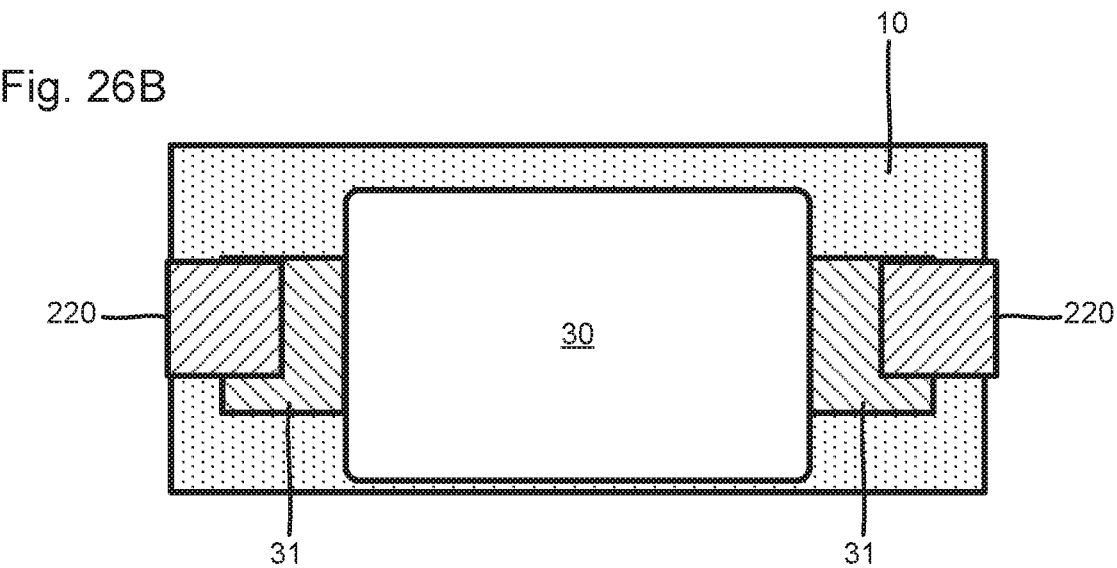

In the step S24, the electrode terminal 31 of the secondary battery 30 is held by the conductive member 220. For example, as shown in FIGS. 25A and 25B, when the conductive member 220 having the gap G that is wider than the thickness of the electrode terminal 31 is prepared as a conductive member, arranging the electrode terminal 31 in the gap G of the conductive member 220 to narrow the width of the gap G makes it possible for the conductive member 220 to hold the electrode terminal 31. The way of narrowing the width of the gap G of the conductive member 220 is not particularly limited, and for example, as shown in FIG. 25B, pressure can be applied to the conductive member 220. Such pressure may be applied by, for example, the constraining member 60. If the supporting member 270 is arranged in the step S23, the step S24 may be carried out after the supporting member is detached, and may be carried out as the supporting member stays as it is.

As shown in FIG. 25B, the secondary battery module 300 including a plurality of the stack units 250 is obtained via the steps S21 to 24.

3.4.5. Step S25

Figure 27A:
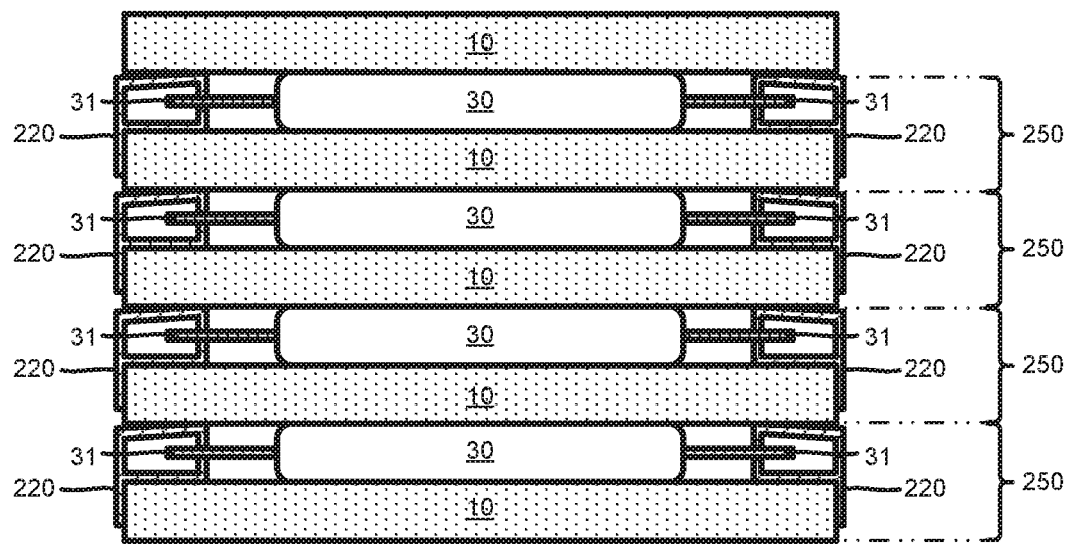
FIGS. 27A to 27C are explanatory schematic views of a step S25 in the production method S30.
Figure 27B:
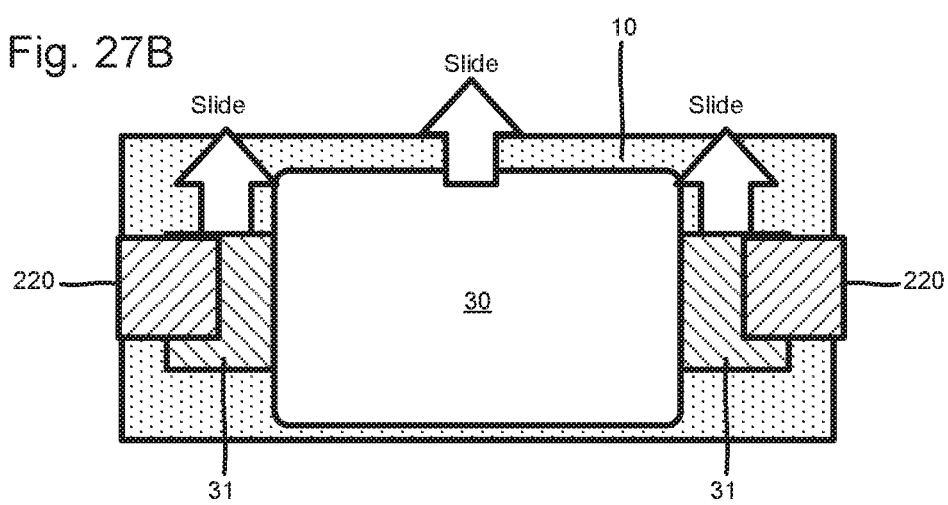
Figure 27C:
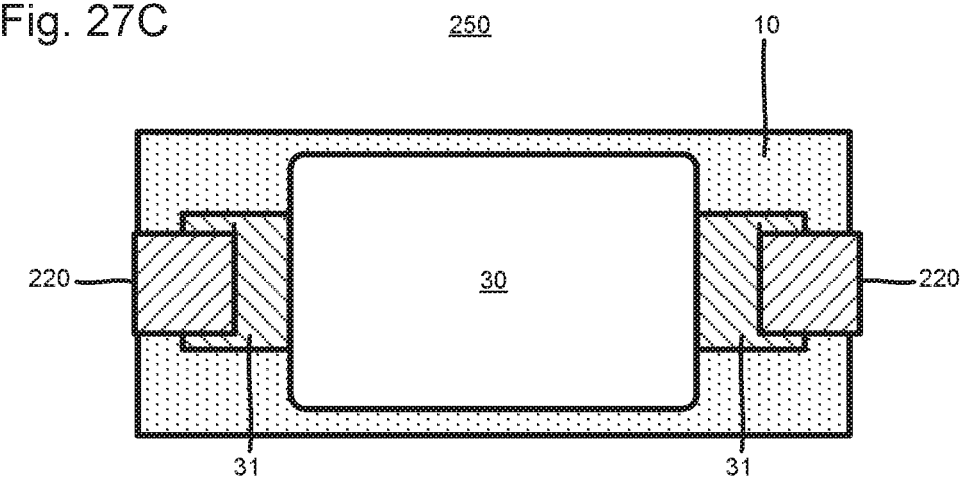

In the production method S30, after held by the conductive member 220 via the steps S23 and S24, the electrode terminal 31 may be slid in the step S25. For example, in the step S23, the secondary battery 30 is stacked on the plate member 10 so that the position of the center of the electrode terminal 31 in the width direction intentionally shifts from that of the abutting part 222 of the conductive member 220 as shown in the side view of FIG. 26A, and the top view of FIG. 26B. In this condition, in the step S24, the width of the gap G of the conductive member 220 is narrowed, to hold the electrode terminal 31 by the conductive member 220 as shown in FIG. 27A. Thereafter, in the step S25, the electrode terminal 31 is slid to make the position of the center of the electrode terminal 31 in the width direction close to that of the abutting part 222 of the conductive member 220 as shown in FIGS. 27B and 27C. Sliding the electrode terminal 31 after the conductive member 220 holds the electrode terminal 31 as described above may cause friction of the conductive member 220 and the electrode terminal 31 to damage, or partially shave the surface of the electrode terminal 31. For example, even when oxide film is formed over the surface of the electrode terminal 31, the friction of the conductive member 220 and the electrode terminal 31 makes it possible to remove the oxide film, to lower the contact resistance of the conductive member 220 and the electrode terminal 31. Lowering the contact resistance of the conductive member 220 and the electrode terminal 31 may suppress heat generation at the holding part even when a large current flows. In addition, the performance of the secondary battery 30 is difficult to deteriorate when the secondary battery 30 is charged/discharged via the conductive member 220.

4. Fourth Embodiment (Example of Usage)

In the secondary battery module of the present disclosure, for example, secondary batteries may be individually charged/discharged as terminals of a charge/discharge device as disclosed in JP 2013-219986 A and JP 5312000 B2 are respectively put onto conductive members of the secondary battery module. According to the secondary battery module of the present disclosure, conductive members assembled in the module function as terminals, which makes it possible to connect the secondary batteries and a charge/discharge device with a stably low resistance without any unnecessary deformation of the secondary batteries or electrode terminals.

Figure 28A:
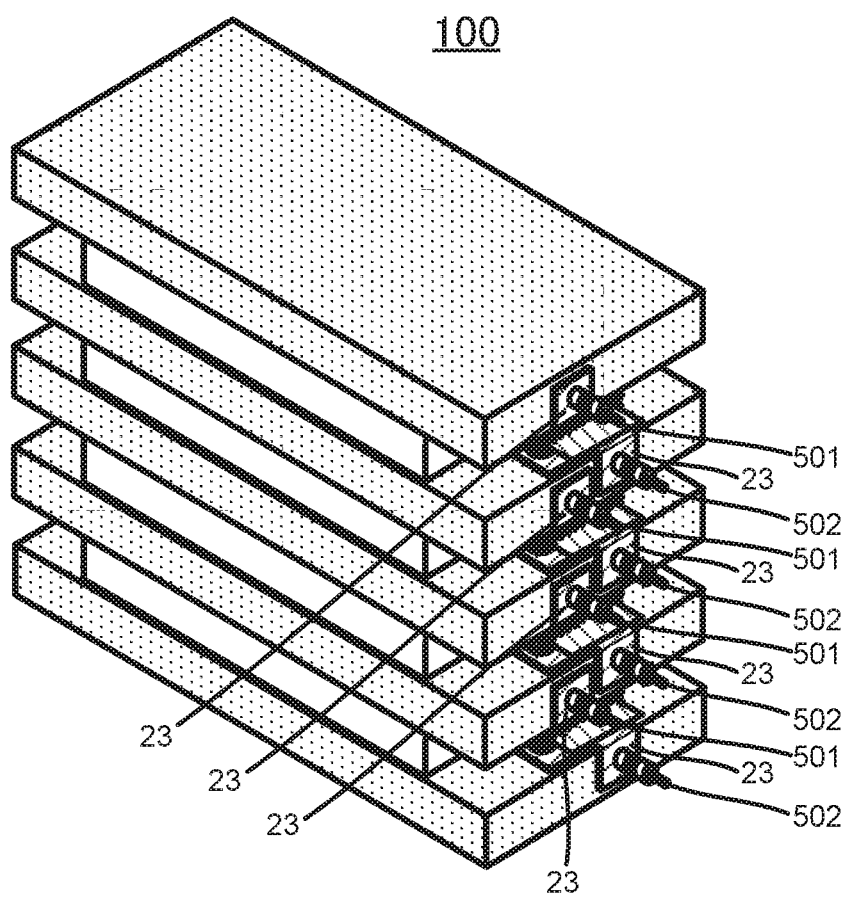
FIGS. 28A and 28B are explanatory schematic views of one example of a mode of using the secondary battery module.
Figure 28B:
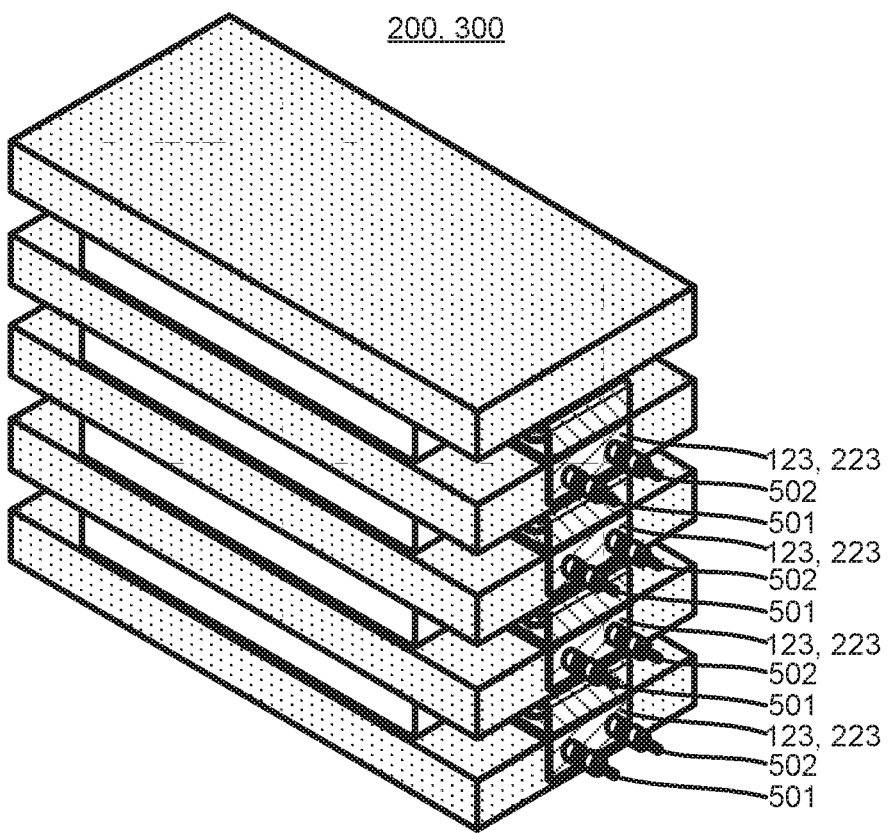

FIGS. 28A and 28B show one example of the places where terminals of a charge/discharge device are arranged for the secondary battery module. FIG. 28A shows the case where the secondary battery module 100 is charged/discharged, and FIG. 28B shows the case where the secondary battery module 200 or 300 is charged/discharged. As shown in FIGS. 28A and 28B, when the secondary battery module 100, 200 or 300 is charged/discharged, terminals of a charge/discharge device are respectively put onto the conductive members 20, 120 or 220. Here, as shown in FIGS. 28A and 28B, the charge/discharge device may include a voltage terminal 501 to measure the voltage of the secondary battery 30, and a current terminal 502 to measure a current flowing in the conductive member 20, 120 or 220, as charging/discharging terminals. In this case, the voltage terminal 501 and the current terminal 502 may be respectively put onto different portions of one conductive member 20, 120 or 220. For example, when the conductive member is made up of a plurality of components, that is, the components 20a and 20b, the components 120a and 120b, or the components 220a and 220b, the voltage terminal 501 may be put onto one component, and the current terminal 502 may be put onto the other component (see FIG. 28A). Or, both the voltage terminal 501 and the current terminal 502 may be put onto only one of a plurality of the components (see FIG. 28B). Particularly, as shown in FIGS. 28A and 28B, when the conductive member has the hooking part 23, 123 or 223, the terminals 501 and 502 may be put onto this hooking part 23, 123 or 223. Putting the voltage terminal 501 and the current terminal 502 onto the conductive member(s) individually causes the connection resistance of the current terminal not to affect the voltage measurement, which makes it possible to do a higher-accuracy charge/discharge test.

Figure 29A:
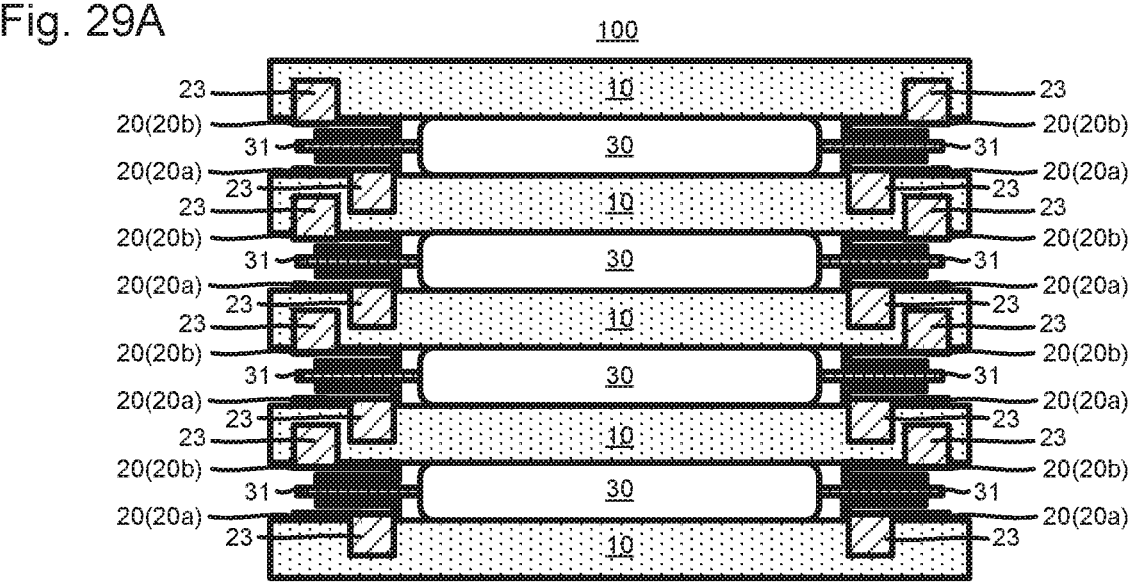
FIGS. 29A to 29C are explanatory schematic views of other examples of positions of the hooking parts in the secondary battery module.
Figure 29B:
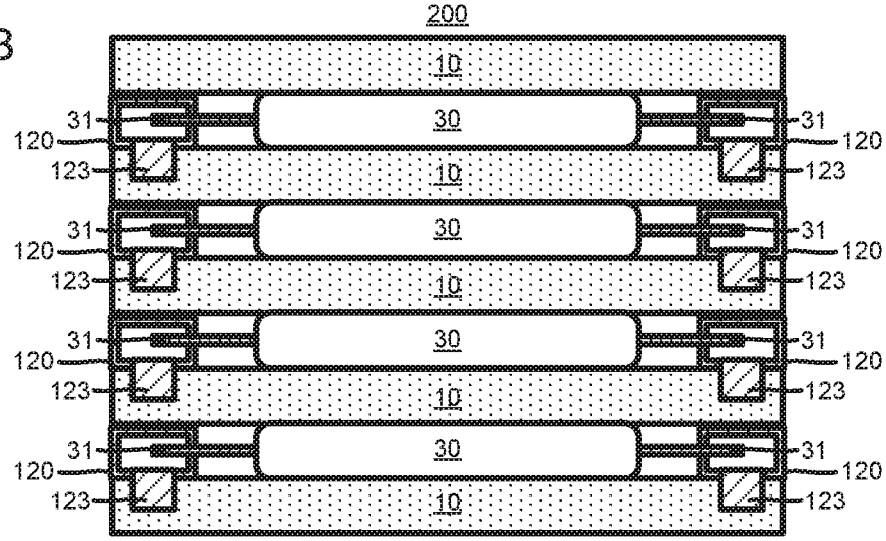
Figure 29C:
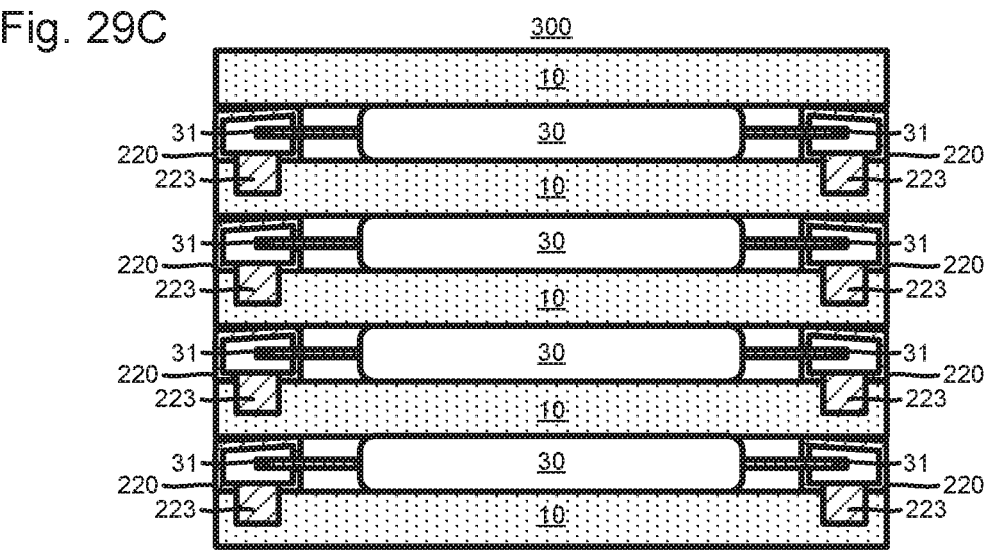

As shown in FIGS. 29A to 29C, arrangement of the portions of the conductive members onto which the charging/discharging terminals are put, or the hooking parts 23, 123 or 223 on the same side of the secondary battery module makes it easier to put the charging/discharging terminals of the charge/discharge device onto the conductive members of the secondary battery module. That is, in the secondary battery module including a plurality of the stack units, the conductive member of each stack unit may have the hooking part 23, 123 or 223 that is arranged on a side face of the plate member, and this hooking part 23, 123 or 223 may be arranged along the same side face of the secondary battery module.

In the foregoing description, the secondary battery module of the present disclosure shall include a plurality of "stack units", and these stack units have been described in detail. In contrast, the secondary battery module of the present disclosure may be expressed as follows. That is, the secondary battery module of the present disclosure may be a secondary battery module (100, 20, 300) of stacking a plurality of secondary batteries (30), the secondary battery module comprising at least one electrode terminal (31) connected to each of the secondary batteries (30) and sticking out from a side face of each of the secondary batteries (30), the side face being in a stacking direction, at least one non-conductive plate member (10) each inserted between the secondary batteries (30), and at least one conductive member (20, 120, 220) fixed to the plate member (10), wherein the conductive member (20, 120, 220) holds the electrode terminal (31) so as to abut the electrode terminal (31).

INDUSTRIAL APPLICABILITY

The secondary battery module of the present disclosure may be preferably used as, for example, a large-sized automobile power source.

REFERENCE SIGN LIST 10 plate member
20, 120, 220 conductive member
30 secondary battery
50, 150, 250 stack unit
60 constraining member
100, 200, 300 secondary battery module

What is claimed is:

1. A secondary battery module that includes a plurality of stack units, each of the stack units comprising:
   at least one non-conductive plate member;
   at least one conductive member fixed to the plate member;
   a secondary battery stacked on the plate member; and
   at least one electrode terminal sticking out of a side face of the secondary battery, and held by the conductive member, wherein
   the conductive member has notches, so that tops of protruding portions of the notches are in contact with a surface of the electrode terminal.

2. The secondary battery module according to claim 1, wherein
   the conductive member holding the electrode terminal is made up of a plurality of components in combination.

3. The secondary battery module according to claim 1, wherein
   the conductive member holding the electrode terminal includes a component A abutting one face of the electrode terminal, and a component B abutting another face of the electrode terminal.

4. The secondary battery module according to claim 3, wherein
   the component A is fixed to one of the plate members, the one being arranged on the component A on one side, and the component B is fixed to another one of the plate members, the other one being arranged on the component B on another side.

5. The secondary battery module according to claim 1, wherein
   the conductive member is fixed only to one of the plate members, the one being arranged on the conductive member on one side.

6. The secondary battery module according to claim 1, wherein
   the secondary battery module is structured so that:
   pressure is applied to the conductive member; and
   stopping applying the pressure releases the conductive member from holding the electrode terminal.

7. The secondary battery module according to claim 1, wherein
   the conductive member holds the electrode terminal between one and another one of the plate members, the one being arranged on the conductive member on one side, the other one being arranged on the conductive member on another side.

8. The secondary battery module according to claim 1, wherein the conductive member has a hooking part arranged along a side face of the plate member.

9. A method of producing a secondary battery module according to claim 1, the method comprising:
   preparing the at least one non-conductive plate member, the at least one conductive member, and the secondary battery, out of the secondary battery the at least one electrode terminal sticking;
   fixing the conductive member to the plate member;
   stacking the secondary battery on the plate member; and
   holding, by the conductive member, the electrode terminal of the secondary battery.

10. The method according to claim 9, wherein
    the at least one conductive member having a gap that is wider than a thickness of the electrode terminal is prepared as the conductive member, and
    after the electrode terminal is arranged in the gap of the conductive member, a width of the gap is narrowed, to hold the electrode terminal by the conductive member.

11. The method according to claim 9, wherein after the electrode terminal is held by the conductive member, the electrode terminal is slid.

12. The method according to claim 9, wherein
    the at least one conductive member having a gap is prepared as the conductive member, a width of the gap being narrower than a thickness of the electrode terminal, and
    the electrode terminal is inserted into the gap of the conductive member, to hold the electrode terminal by the conductive member.

* * * * *